US012467280B2

(12) United States Patent
Reese et al.

(10) Patent No.: US 12,467,280 B2
(45) Date of Patent: Nov. 11, 2025

(54) REDUNDANT ACTUATION LOCK DECOUPLING SYSTEM AND METHODS OF USE

(71) Applicant: TRANSFORM SR BRANDS LLC, Hoffman Estates, IL (US)

(72) Inventors: Brian Todd Reese, St. Charles, IL (US); Cody Lyle Mayer, Chicago, IL (US)

(73) Assignee: Transform SR Brands LLC, Hoffman Estates, IL (US)

( * ) Notice: Subject to any disclaimer, the term of this patent is extended or adjusted under 35 U.S.C. 154(b) by 246 days.

(21) Appl. No.: 18/144,344

(22) Filed: May 8, 2023

(65) Prior Publication Data

US 2023/0272644 A1 Aug. 31, 2023

Related U.S. Application Data

(63) Continuation of application No. 16/921,166, filed on Jul. 6, 2020, now Pat. No. 11,643,843, which is a (Continued)

(51) Int. Cl.

*E05B 47/02* (2006.01)
*E05B 47/00* (2006.01)

(Continued)

(52) U.S. Cl.

CPC .......... *E05B 47/0012* (2013.01); *E05B 47/02* (2013.01); *E05B 2009/047* (2013.01);

(Continued)

(58) Field of Classification Search

CPC ...... E05B 47/00; E05B 47/0012; E05B 47/02; E05B 15/004; E05B 2009/047;

(Continued)

(56) References Cited

U.S. PATENT DOCUMENTS 4,833,465 A 5/1989 Abend et al.
5,083,448 A 1/1992 Karkkainen et al.

(Continued)

FOREIGN PATENT DOCUMENTS

CN 201372636 12/2009
EP 0482117 B1 3/1994

(Continued)

OTHER PUBLICATIONS

European Search Report (EESR) for European Patent Application No. 17 153 121.3, dated Jun. 20, 2017, 10 pages.

(Continued)

*Primary Examiner* — Suzanne L Barrett
(74) *Attorney, Agent, or Firm* — McAndrews, Held & Malloy, Ltd.

(57) ABSTRACT

A redundant actuation lock apparatus includes an interface, an electronic mechanism, and a manual mechanism. The interface manipulates lock bar(s) into a locked/unlocked position. The electronic mechanism includes an actuator and power drive. The actuator is disengageably coupled to and drives the interface. The power drive is coupled to and drives the actuator in response to a control signal. The manual mechanism includes a key input and an output. The key input receives and rotates with a mechanical key. The output disengageably couples to the interface and rotates with the mechanical key. The actuator is engaged with and the output is disengaged from the interface in an electronic mode, while the actuator is disengaged from and the output is engaged with the interface in a manual mode.

27 Claims, 18 Drawing Sheets

Related U.S. Application Data continuation of application No. 16/555,373, filed on Aug. 29, 2019, now Pat. No. 10,704,296, which is a continuation of application No. 15/413,664, filed on Jan. 24, 2017, now Pat. No. 10,400,478.

(60) Provisional application No. 62/295,780, filed on Feb. 16, 2016, provisional application No. 62/286,776, filed on Jan. 25, 2016.

(51) Int. Cl.
*E05B 9/04* (2006.01)
*E05B 15/00* (2006.01)

(52) U.S. Cl.
CPC ....... *E05B 15/004* (2013.01); *E05B 2047/002* (2013.01); *E05B 2047/0026* (2013.01); *E05B 2047/0031* (2013.01); *E05B 2047/0084* (2013.01); *E05B 2047/0086* (2013.01); *E05B 2047/0095* (2013.01)

(58) Field of Classification Search
CPC ....... E05B 2047/002; E05B 2047/0026; E05B 2047/0031; E05B 2047/0084; E05B 2047/0086; E05B 2047/0095; Y10T 70/5681; Y10T 70/5823; Y10T 70/5827; Y10T 70/7107; Y10T 70/7113; Y10T 70/7119; Y10T 70/7124; Y10T 70/713; Y10T 70/7136
USPC .... 70/190, 222, 223, 279.1, 280–283, 283.1
See application file for complete search history.

(56) References Cited

U.S. PATENT DOCUMENTS

| | | | | |
|---|---|---|---|---|
| 5,113,675 | A | 5/1992 | Uyeda | |
| 8,225,629 | B2 | 7/2012 | Zuraski | |
| 8,640,513 | B2 | 2/2014 | Goren et al. | |
| 8,720,239 | B2 | 5/2014 | Crass et al. | |
| 8,839,650 | B2 | 9/2014 | Zuraski | |
| 9,784,016 | B1 | 10/2017 | Cabral Herrera | |
| 9,852,562 | B2 | 12/2017 | Belhadia et al. | |
| 10,400,478 | B2 | 9/2019 | Reese et al. | |
| 10,704,296 | B2 | 7/2020 | Reese et al. | |
| 10,851,566 | B2 * | 12/2020 | Deppe | F16H 25/24 |
| 11,643,843 | B2 * | 5/2023 | Reese | E05B 47/02 70/279.1 |
| 2005/0199019 | A1 | 9/2005 | Marcelle et al. | |
| 2006/0283216 | A1 | 12/2006 | Marcelle et al. | |

FOREIGN PATENT DOCUMENTS

| | | | |
|---|---|---|---|
| EP | 1126105 | A2 | 8/2001 |
| GB | 2179095 | A | 2/1987 |
| GB | 2307270 | A | 5/1997 |
| WO | 0188315 | A1 | 11/2001 |

OTHER PUBLICATIONS

Office Action for Canadian Application No. 2,955,963, dated Nov. 3, 2017, 5 pages.

Office Action for Chinese Patent Application No. 2017100632522 mailed Oct. 25, 2019, 12 pages.

* cited by examiner

REDUNDANT ACTUATION LOCK DECOUPLING SYSTEM AND METHODS OF USE

CROSS-REFERENCE TO RELATED APPLICATIONS/INCORPORATION BY REFERENCE

The present application is a continuation of co-pending application Ser. No. 16/921,166, filed Jul. 6, 2020, which is a continuation of application Ser. No. 16/555,373, filed Aug. 29, 2019, issued as U.S. Pat. No. 10,704,296, which is a continuation of application Ser. No. 15/413,664, filed on Jan. 24, 2017, issued as U.S. Pat. No. 10,400,478, which claims priority under 35 U.S.C. § 119(e) to provisional application Ser. No. 62/286,776 filed on Jan. 25, 2016, and provisional application Ser. No. 62/295,780, filed on Feb. 16, 2016. Each of the above-mentioned applications is hereby expressly incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD

Certain embodiments are related to a redundant actuation lock decoupling system and method of use. More specifically, various embodiments provide a redundant actuation lock apparatus having mechanisms for decoupling an interface that moves one or more lock bars between locked and unlocked positions from a manual key lock mechanism if operating in an electronic lock actuation mode and from an electronic lock mechanism if operating in a manual key lock actuation mode.

BACKGROUND

Electronic locking devices provide several advantages over conventional mechanical key locking systems. For example, electronic locking devices may allow remote control of a lock, proximity-based control of the lock, the addition or removal of keys without re-keying a lock cylinder, key access activity recording, and the like. Electronic locking devices may rely, however, on a power source and a wireless connection, among other things. Accordingly, it may be advantageous to retain a redundant manual operation capability to bypass the electronic control in the event of a failure of one or more components of the electronic locking device.

Existing electronic locking devices with redundant manual operation capability suffer from various problems. For example, typical electronic actuated mechanisms do not function independent of the manual key mechanism. Moreover, even in systems having mechanisms for disengaging components of one or both of the electronic locking device when operating the manual key mechanism or vice versa, the disengagement does not occur at the interface that moves the lock bar(s) between locked and unlocked positions. Instead, the interface continues interacting with components of the electronic locking device when operating the manual key mechanism or vice versa, which increases the wear and tear on some of the components of the system and may increase the power drive force or manual drive force needed to operate the system.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A redundant actuation lock apparatus is configured to decouple a lock bar interface from a manual key lock mechanism in an electronic lock actuation mode and configured to decouple the lock bar interface from an electronic lock mechanism in a manual key lock actuation mode, substantially as shown in and/or described in connection with at least one of the figures, as set forth more completely in the claims.

These and other advantages, aspects and novel features of the present disclosure, as well as details of illustrated embodiments, will be more fully understood from the following description and drawings.

DETAILED DESCRIPTION

Figure 1:
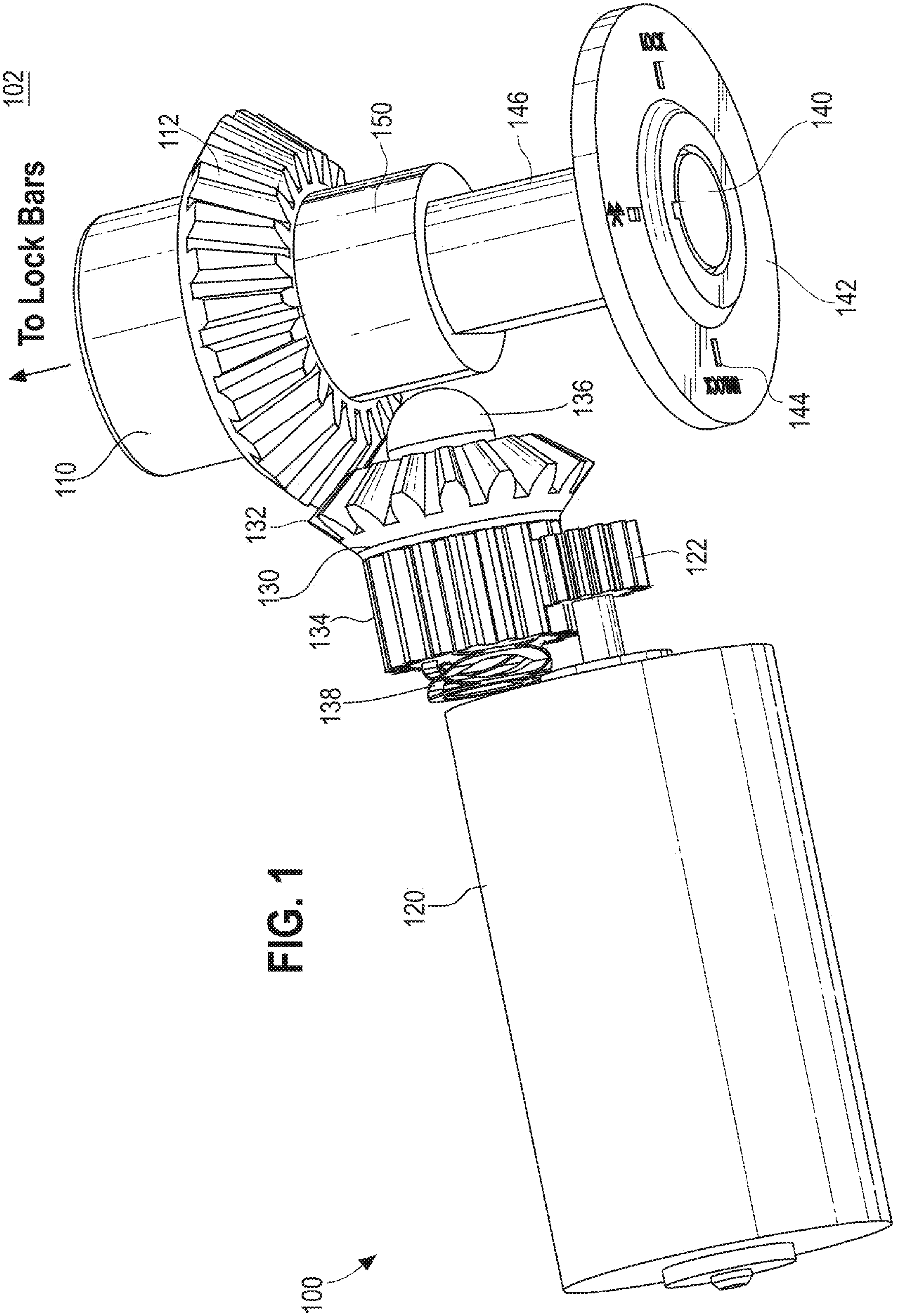
FIG. 1 is a perspective view of an exemplary redundant actuation lock apparatus, in accordance with various embodiments.

Certain embodiments may be found in a redundant actuation lock apparatus 100 and methods 200, 300 of using the redundant actuation lock apparatus 100. More specifically, certain embodiments provide a redundant actuation lock apparatus 100 configured to decouple a lock bar interface 110 from a manual key lock mechanism 140-154 if the redundant lock apparatus 100 is operating in an electronic lock actuation mode, and configured to decouple the lock bar interface 110 from an electronic lock mechanism 120-138 if the redundant lock apparatus 100 is operating in a manual key lock actuation mode. In this way, the redundant actuation lock apparatus 100 provides mutually independent electronic lock and manual key lock mechanisms. In various embodiments, the manual key lock mechanism 140-154 comprises a lock cylinder output 150 having an internal interlock 152 configured to disengageably couple with the lock bar interface 110. In certain embodiments, the manual key lock mechanism 140-154 comprises a lock cylinder output 150 having an external cam 154 configured to disengage and/or reengage the actuator 130 of the electronic lock mechanism 120-138 to the lock bar interface 110.

As used herein, an element recited in the singular and proceeded with the word "a" or "an" should be understood as not excluding the plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Although certain embodiments in the foregoing description may be described as operating to lock and/or unlock a tool box, for example, unless so claimed, the scope of various aspects of the present disclosure should not be limited to tool boxes and may additionally and/or alternatively be applicable to any suitable apparatus utilizing a locking mechanism.

Figure 2:
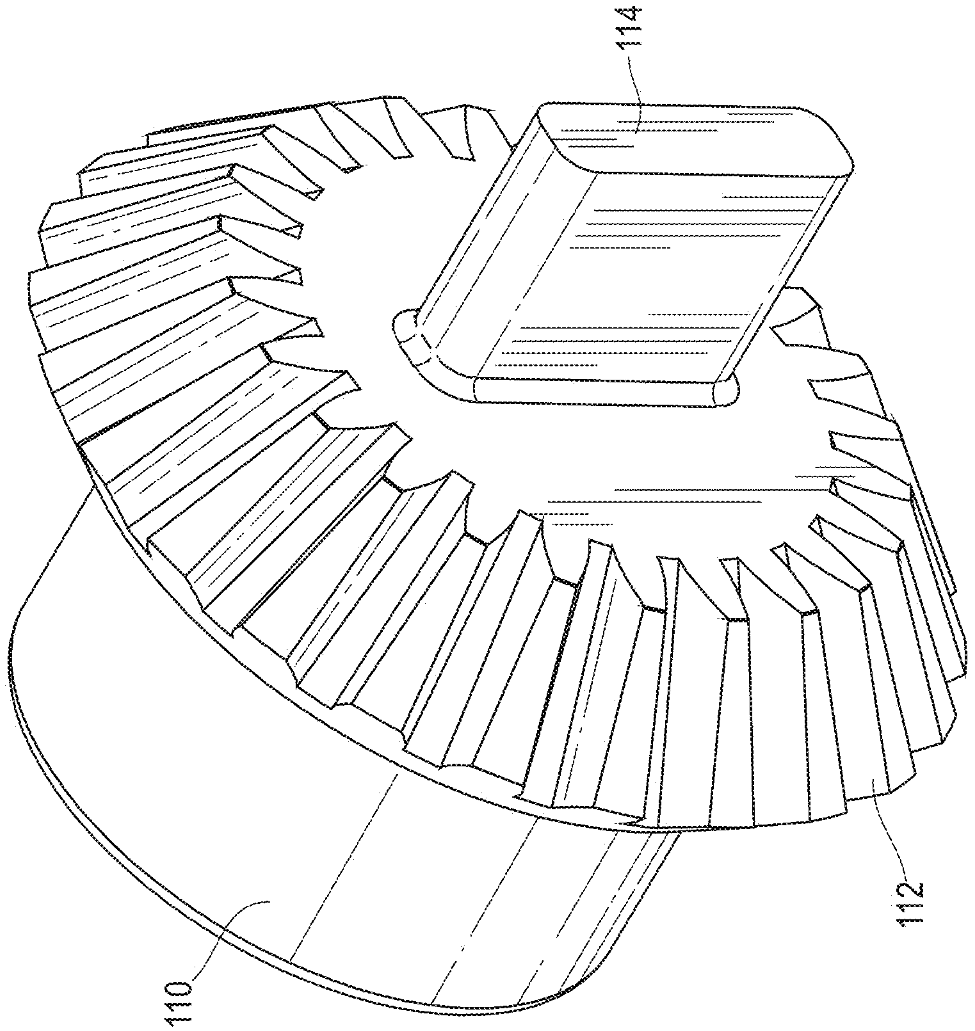
FIG. 2 is a perspective view of an exemplary lock bar interface, in accordance with various embodiments.

FIG. 1 is a perspective view of an exemplary redundant actuation lock apparatus 100, in accordance with various embodiments. Referring to FIG. 1, the redundant actuation lock apparatus 100 may comprise a lock bar interface 110, an electronic lock mechanism 120-138, and a manual key lock mechanism 140-154. The lock bar interface 110 is configured to move lock bar(s) 102 between locked and unlocked positions. The lock bar interface 110 may be engaged with the electronic lock mechanism 120-138 and disengaged from the manual key lock mechanism 140-154 if operating in an electronic lock actuation mode to lock and/or unlock the lock bar(s) 102. The lock bar interface 110 may be engaged with the manual key lock mechanism 140-154 and disengaged from the electronic lock mechanism 120-138 if operating in a manual key lock actuation mode to lock and/or unlock the lock bar(s) 102. FIG. 2 is a perspective view of an exemplary lock bar interface 110, in accordance with various embodiments. Referring to FIG. 2, the lock bar interface 110 may comprise gear teeth 112 and a gear head 114. The lock bar gear teeth 112 may be configured to disengageably couple with an actuator 130 of the electronic lock mechanism 120-138 to lock and/or unlock the lock bar(s) 102 in the electronic lock actuation mode. The lock bar gear teeth 112 may, for example, mesh with actuator gear teeth 132 if engaged such that the actuator 130 may drive the lock bar interface 110. The lock bar gear head 114 may be configured to disengageably couple with a lock cylinder output 150 of the manual key lock mechanism 140-154 to lock and/or unlock the lock bar(s) 102 in the manual key lock actuation mode. The lock bar gear head 114 may be, for example, a shaft having at least two flat edges that may be engaged and driven by a lock cylinder interlock 152 of the lock cylinder output 150 as described below.

Referring again to FIG. 1, the electronic lock mechanism 120-138 may comprise a power drive 120 and an actuator 130. The primary power drive 120 may be an electric motor, such as a DC motor, or any suitable motor. The primary power drive 120 may be configured to receive a control signal and in response, may be operable to drive the actuator 130 in one of a first direction to interact with the lock bar interface 110 to lock the lock bar(s) 102 or in a second direction to interact with the lock bar interface 110 to unlock the lock bar(s) 102. For example, the primary power drive 120 may comprise a power drive gear 122 having gear teeth configured to mate with gear teeth 134 of the actuator 130. The power drive gear 122 may be rotated by the power drive 120 in one of a first direction to drive the actuator 130 in a first direction or a second direction to drive the actuator 130 in a second direction. The control signal may correspond with a detected proximity of a mobile device or an activation of a button or switch on the mobile device, such as a smartphone, remote control, or any suitable mobile device. The detected proximity and/or activation of the button or switch on the mobile device may correspond with an instruction for moving the lock bar(s) 102 to a locked position or an unlocked position.

The actuator 130 may comprise an interface 132 to the lock bar interface 110, an interface 134 to the power drive 120, a decoupling device 136, and a flexible biasing member 138. The interface 132 to the lock bar interface 110 may be, for example, gear teeth for meshing with the lock bar gear teeth 112. The interface 134 to the power drive 120 may be, for example, gear teeth meshing with the gear teeth of the power drive gear 122. The decoupling device 136 may be, for example, a protrusion extending from a head of the actuator 130. In various embodiments, the protrusion 136 may be pushed to move the actuator 130 away from the lock bar interface 110, thereby disengaging the actuator 130 and the lock bar interface 110. For example, as described in more detail below, the lock cylinder output 150 may include a cam 154 that can rotate with the rotation of a mechanical key to push the protrusion 136 and disengage the actuator gear teeth 132 from the lock bar gear teeth 112 to set the redundant actuation lock apparatus 100 in a manual key lock actuation mode. The flexible biasing member 138 may be operable to allow the actuator 130 to disengage from the lock bar interface 110 if the redundant actuation lock apparatus 100 is set to a manual key lock actuation mode. The flexible biasing member 138 may be configured to bias the actuator 130 in engagement with the lock bar interface 110 if the redundant actuation lock apparatus 100 is not set to a manual key lock actuation mode. For example, the flexible biasing member 138 may be a spring or any suitable mechanism for biasing the actuator 130 to an engaged position and providing the flexibility to move to a disengaged position in response to a force exceeding a bias threshold.

Figure 3:
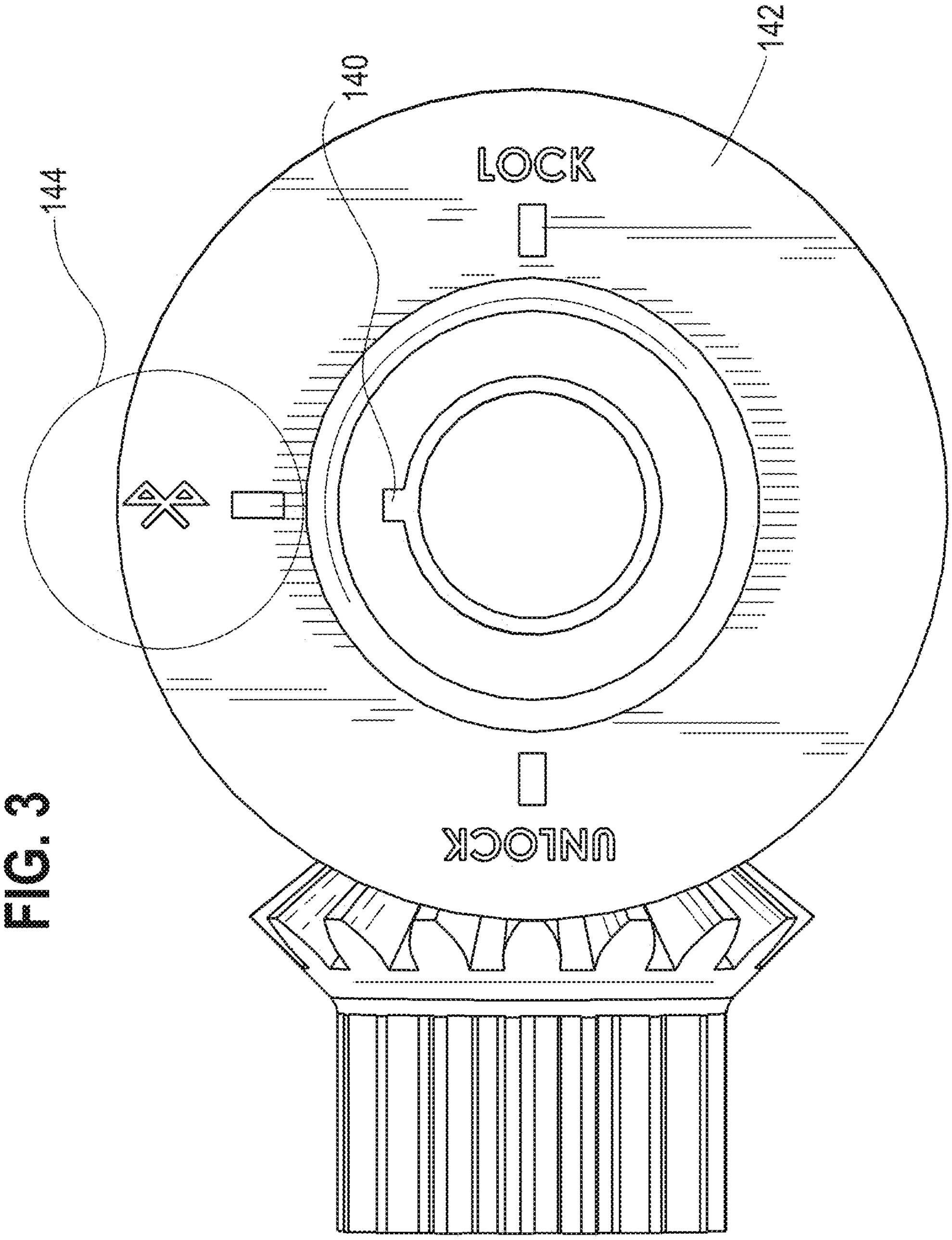
FIG. 3 is a front view of an exemplary key input, in accordance with various embodiments.

Still referring to FIG. 1, the manual key lock mechanism 140-154 may comprise a key input 140, a lock cylinder 146, and a lock cylinder output 150. The key input 140 may be a plug having a slot for accepting a mechanical key. The plug may pivot with rotation of an inserted key. The lock cylinder 146 may be a hollow cylindrical body having a radially projecting chamber, extending along the length of the body for containing pins and bolts. The pins may be employed to prevent pivoting of the plug without the correct mechanical key. The bolts may be coupled at one end to the plug and at an opposite end to a lock cylinder output 150. The bolts may pivot with the plug based on the rotation of the mechanical key, the pivoting of the bolts rotating the lock cylinder output 150 at the opposite end of the lock cylinder 146 in a first direction to lock the lock bar(s) 102 and a second direction to unlock the lock bar(s) 102. The key input 140 and lock cylinder 146 may be mounted to a device, such as a toolbox or any suitable apparatus utilizing a locking mechanism, by a mounting plate 142. In various embodiments, the mounting plate 142 may include markings 144 identifying an unlocked position, a locked position, or any suitable position. FIG. 3 is a front view of an exemplary key input 140, in accordance with various embodiments. Referring to FIG. 3, the key input 140 may comprise a slot in a plug for receiving a mechanical key. The key input may be mounted to the toolbox or any suitable apparatus by the mounting plate 142. The mounting plate 142 may comprise markings 144 illustrating the lock position, unlock position, and/or a central position, for example. In certain embodiments, the central position may correspond with an electronic lock actuation mode.

Referring again to FIG. 1, the rotatable lock cylinder output 150 at the end of the stationary lock cylinder 146 may be disengageably coupled to the lock bar interface 110. The lock cylinder output 150 may be configured to engage and drive the lock bar interface 110 in a first direction to cause the lock bar interface 110 to lock the lock bar(s) 102 or in a second direction to cause the lock bar interface 110 to unlock the lock bar(s) 102 if the redundant actuation lock apparatus 100 is set to a manual key lock actuation mode. In various embodiments, the lock cylinder output 150 may be configured to simultaneously or sequentially disengage the actuator 130 from the lock bar interface 110 and engage the lock cylinder output 150 with the lock bar interface 110 to set the redundant actuation lock apparatus to a manual key lock actuation mode.

Figure 4:
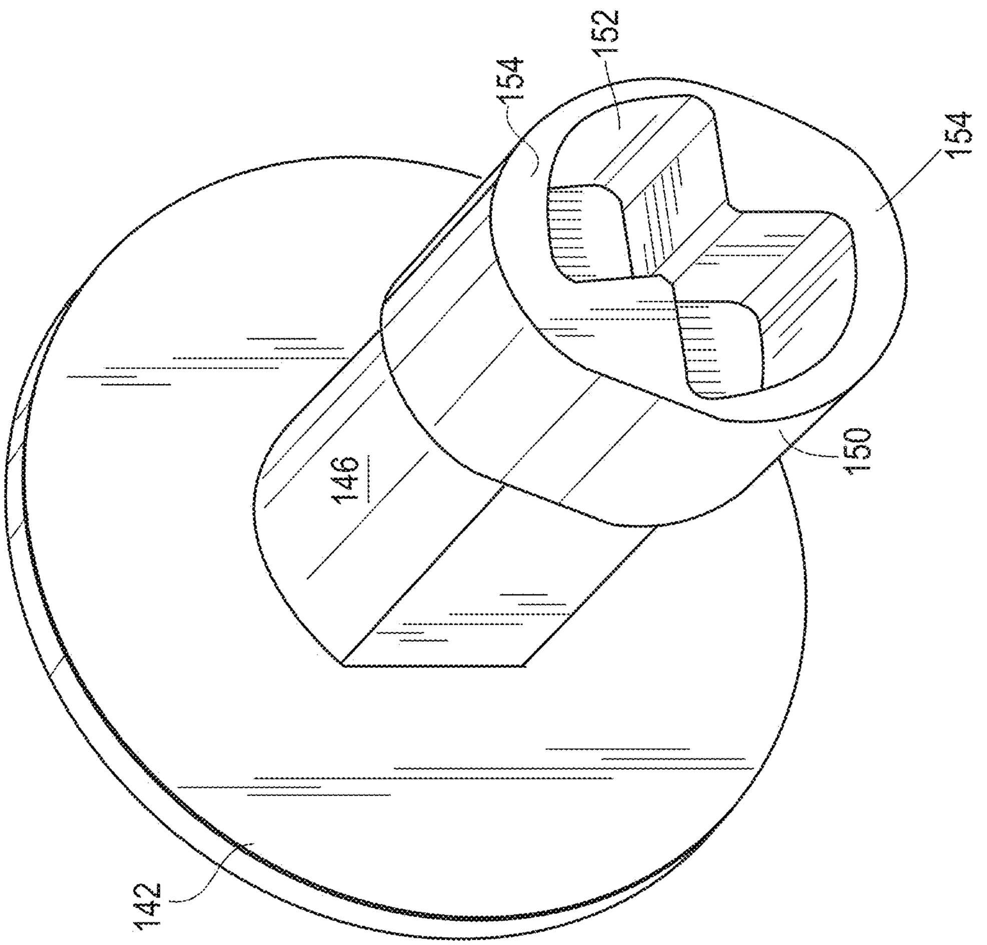
FIG. 4 is a perspective view of an exemplary manual key lock mechanism, in accordance with various embodiments.
Figure 12:
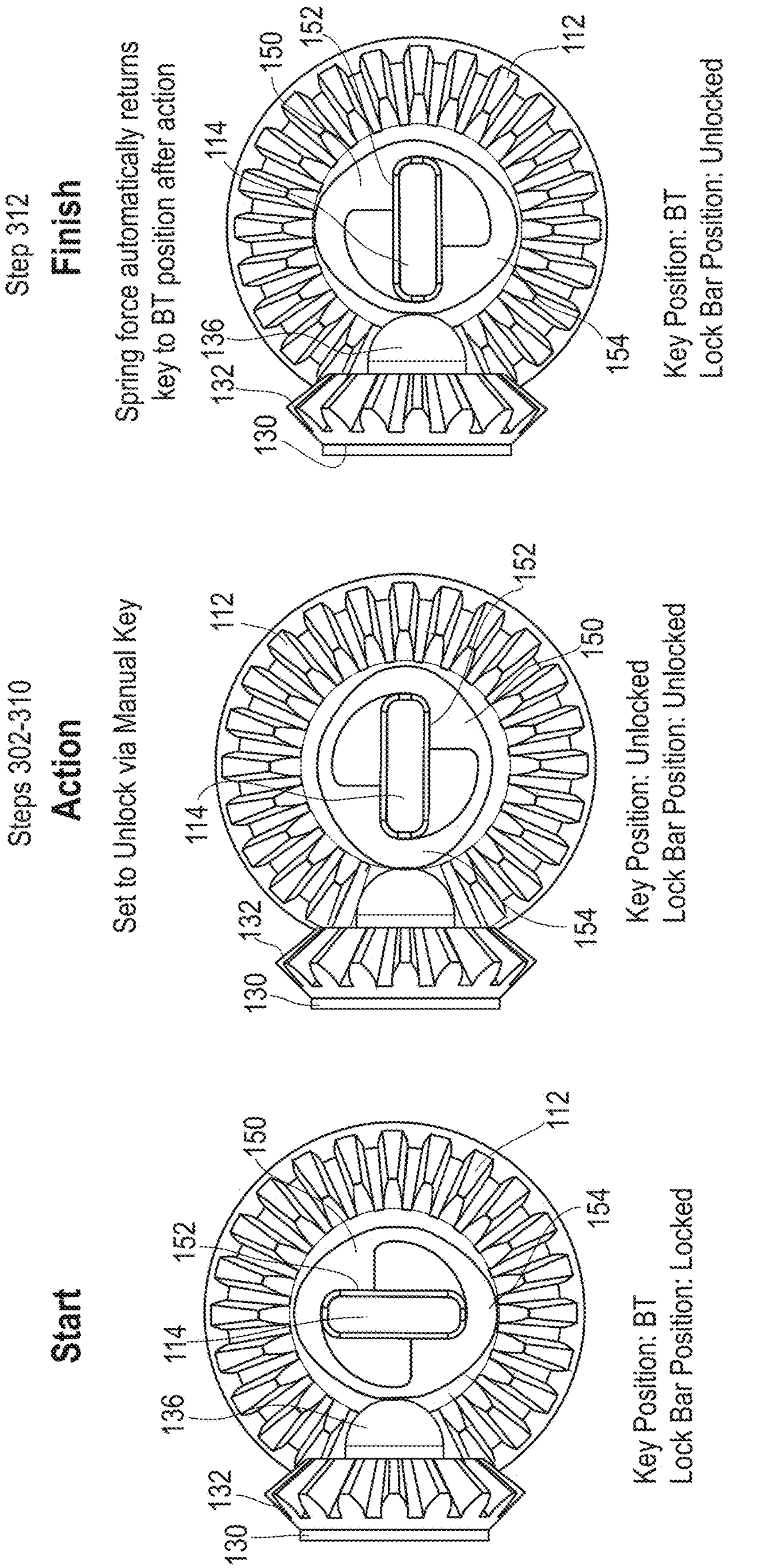
FIG. 12 is partial cross-sectional views of a portion of an exemplary redundant actuation lock apparatus having a first interlock geometry transitioning from a locked position to an unlocked position via a manual key lock actuation mode, in accordance with various embodiments.
Figure 13:
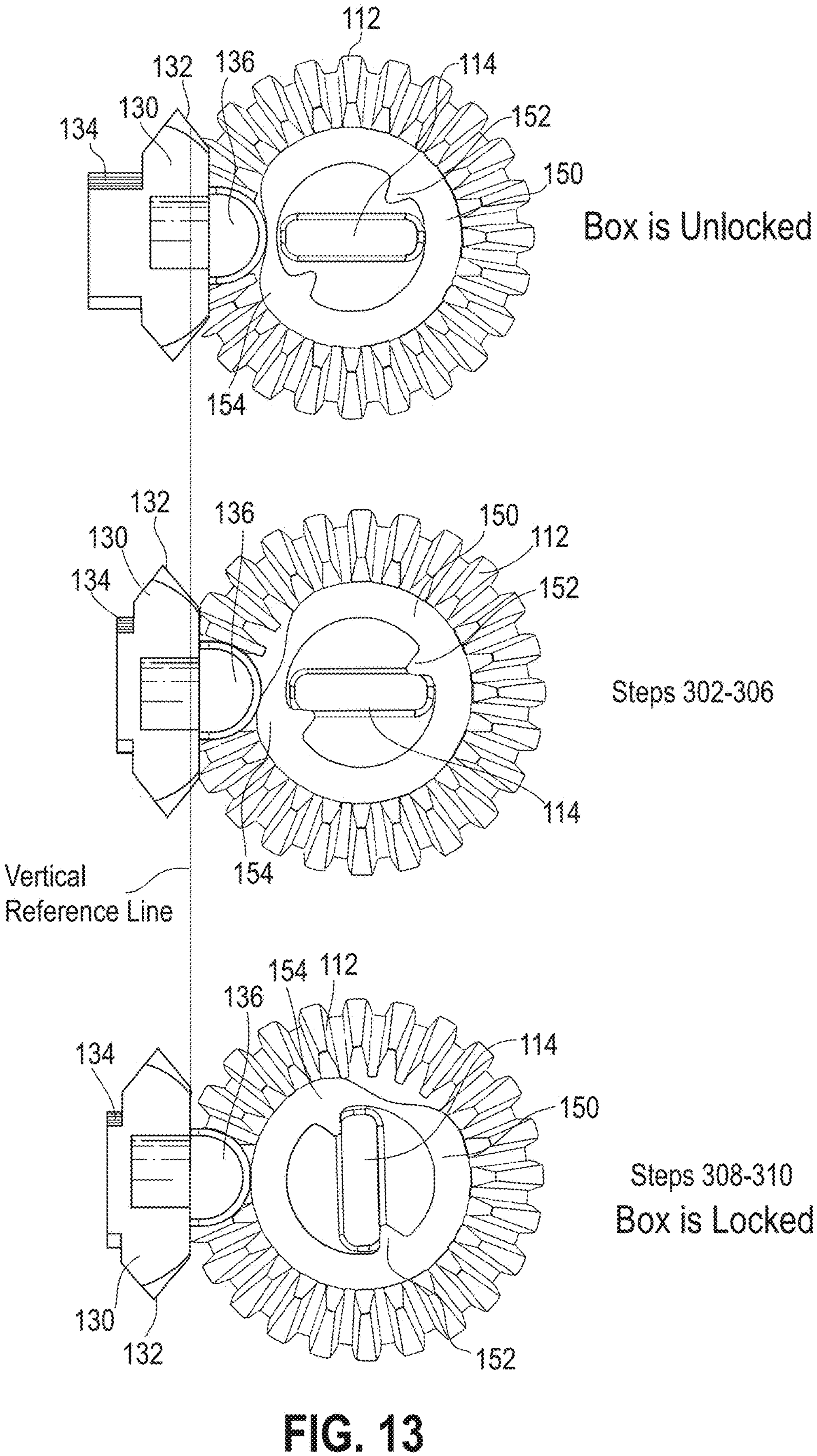
FIG. 13 is partial cross-sectional views of a portion of an exemplary redundant actuation lock apparatus having a second interlock geometry transitioning from an unlocked position to a locked position via a manual key lock actuation mode, in accordance with various embodiments.
Figure 14:
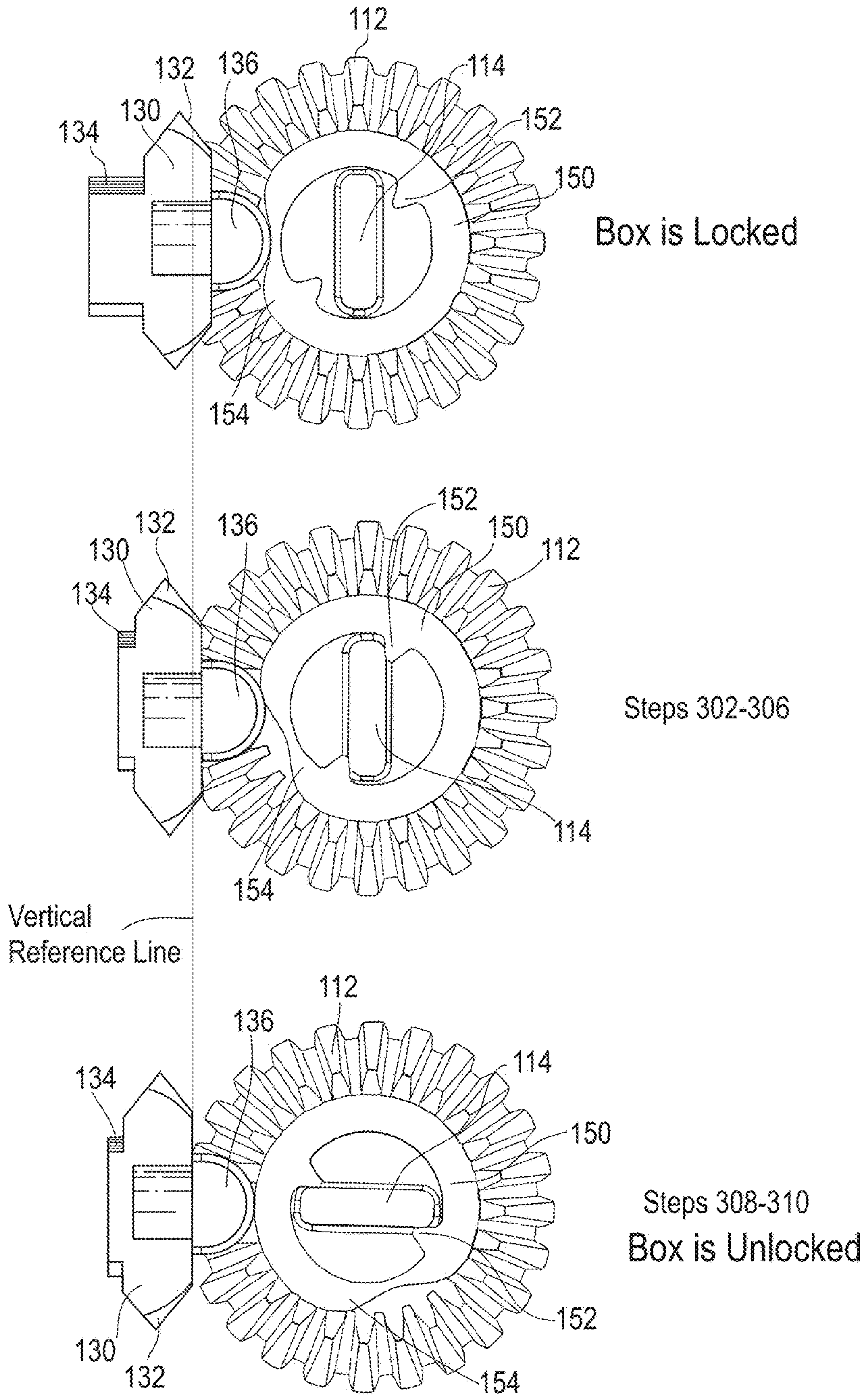
FIG. 14 is partial cross-sectional views of a portion of an exemplary redundant actuation lock apparatus having a second interlock geometry transitioning from a locked position to an unlocked position via a manual key lock actuation mode, in accordance with various embodiments.

FIG. 4 is a perspective view of an exemplary manual key lock mechanism 140-154, in accordance with various embodiments. Referring to FIG. 4, the manual key lock mechanism 140-154 may comprise a lock cylinder 146 coupled to a mounting plate 142 and having a lock cylinder output 150. The lock cylinder output 150 may be a rotatable sleeve, for example, at the end of the lock cylinder 146. The lock cylinder output 150 may comprise an internal interlock portion 152 and an exterior cam portion 154. The internal interlock portion 152 may comprise a shape having a plurality of edges for driving the flat edges of the lock bar gear head 114 shaft such that the lock bar interface 110 rotates to lock or unlock the lock bar(s) 102. For example, one or more of the plurality of edges of the internal interlock portion 152 of the lock cylinder output 150 may engage and drive the lock bar gear head 114 in a first direction if the lock cylinder output 150 is rotated by a mechanical key in the first direction to lock the lock bar(s) 102. As another example, a different one or more of the plurality of edges of the internal interlock portion 152 of the lock cylinder output 150 may engage and drive the lock bar gear head 114 in a second direction if the lock cylinder output 150 is rotated by the mechanical key in the second direction to unlock the lock bar(s) 102. FIGS. 4, 7, 8, 11, and 12 show a first exemplary embodiment of an exemplary shape of the internal interlock portion 152. FIGS. 13 and 14 illustrate a second exemplary embodiment of an exemplary shape of the internal interlock portion 152.

Referring again to FIG. 4, the exterior cam portion 154 of the lock cylinder output 150 may comprise a projected or bulged shape configured to disengage the actuator 130 of the electronic lock mechanism 120-138 from the lock bar interface 110. For example, as a mechanical key inserted in the key input 140 is turned to rotate the lock cylinder output 150, the projection or bulged shape of the exterior cam portion 154 may pivot and push the protrusion 136 extending from the head of the actuator 130 to move the gear teeth 132 of the actuator 130 away from the lock bar gear teeth 112 of the lock bar interface 110. The separation of the actuator gear teeth 132 from the lock bar gear teeth 112 disengages the actuator 130 and the lock bar interface 110. In operation, simultaneously with (see FIGS. 11-12) or subsequent to (see FIGS. 13-14) the exterior cam portion 154 disengaging the actuator 130 of the electronic lock mechanism 120-138 from the lock bar interface 110, the internal interlock portion 152 of the lock cylinder output 150 engages the lock bar interface 110 via the lock bar gear head 114 to manually lock or unlock the lock bar(s) 102 with the rotation of the mechanical key.

Figure 5:
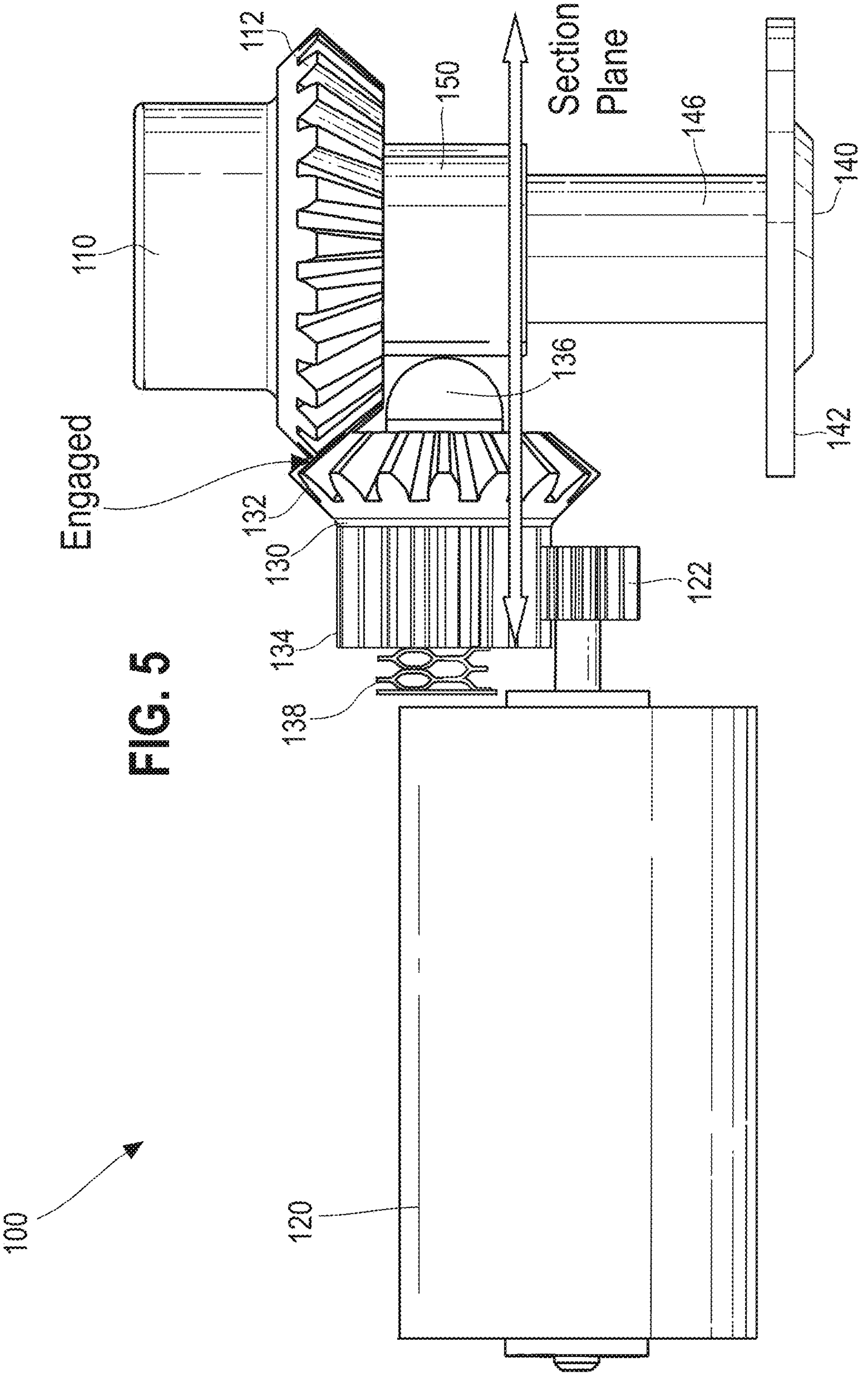
FIG. 5 is a top view of an exemplary redundant actuation lock apparatus having an actuator engaged with the lock bar interface, in accordance with various embodiments.

FIG. 5 is a top view of an exemplary redundant actuation lock apparatus 100 having an actuator 130 engaged with the lock bar interface 110, in accordance with various embodiments. Referring to FIG. 5, the redundant actuation lock apparatus 100 comprises an electronic lock mechanism 120-138 engaged with the lock bar interface 110 and a manual key lock mechanism 140-154 disengaged with the lock bar interface 110 in an electronic lock actuation mode. The electronic lock mechanism 120-138 comprises a power drive 120 and an actuator 130. The power drive 120 may be wirelessly controlled to drive the actuator 130, which drives the lock bar interface 110 to lock or unlock the lock bar(s)

102. The power drive 120 may comprise a power drive gear 122 that may be rotated by the power drive 120 in a first direction to lock the lock bar(s) 102 and in a second direction to unlock the lock bar(s) 102. The actuator 130 may comprise gear teeth 134 for meshing with the power drive gear 122. The actuator 130 may comprise gear teeth 132 that mesh with gear teeth 112 of the lock bar interface 110 to drive the lock bar interface 110. The actuator 130 may comprise a flexible biasing member 138 for biasing the actuator 130 to engagement with the lock bar interface 110. The actuator 130 may comprise a decoupling device 136 used to disengage the actuator 130 from the lock bar interface 110. For example, a force received at the decoupling device 136 that exceeds a bias threshold of the flexible biasing member 138 may push the actuator 130 away from the lock bar interface 110 to disengage the actuator gear teeth 132 and the lock bar interface gear teeth 112.

The manual key lock mechanism 140-154 may comprise a key input 140 at one end of a lock cylinder 146 and a lock cylinder output 150 at an opposite end of the lock cylinder 146. The key input 140 and lock cylinder 146 may be coupled to an apparatus having the redundant actuation lock apparatus 100 by a key input mounting plate 142. The lock cylinder output 150 may be disengageably coupled to the lock bar interface 110.

The exemplary redundant actuation lock apparatus 100 illustrated in FIG. 5 shares various characteristics with the exemplary redundant actuation lock apparatus 100 illustrated in FIGS. 1-4 as described above.

Figure 6:
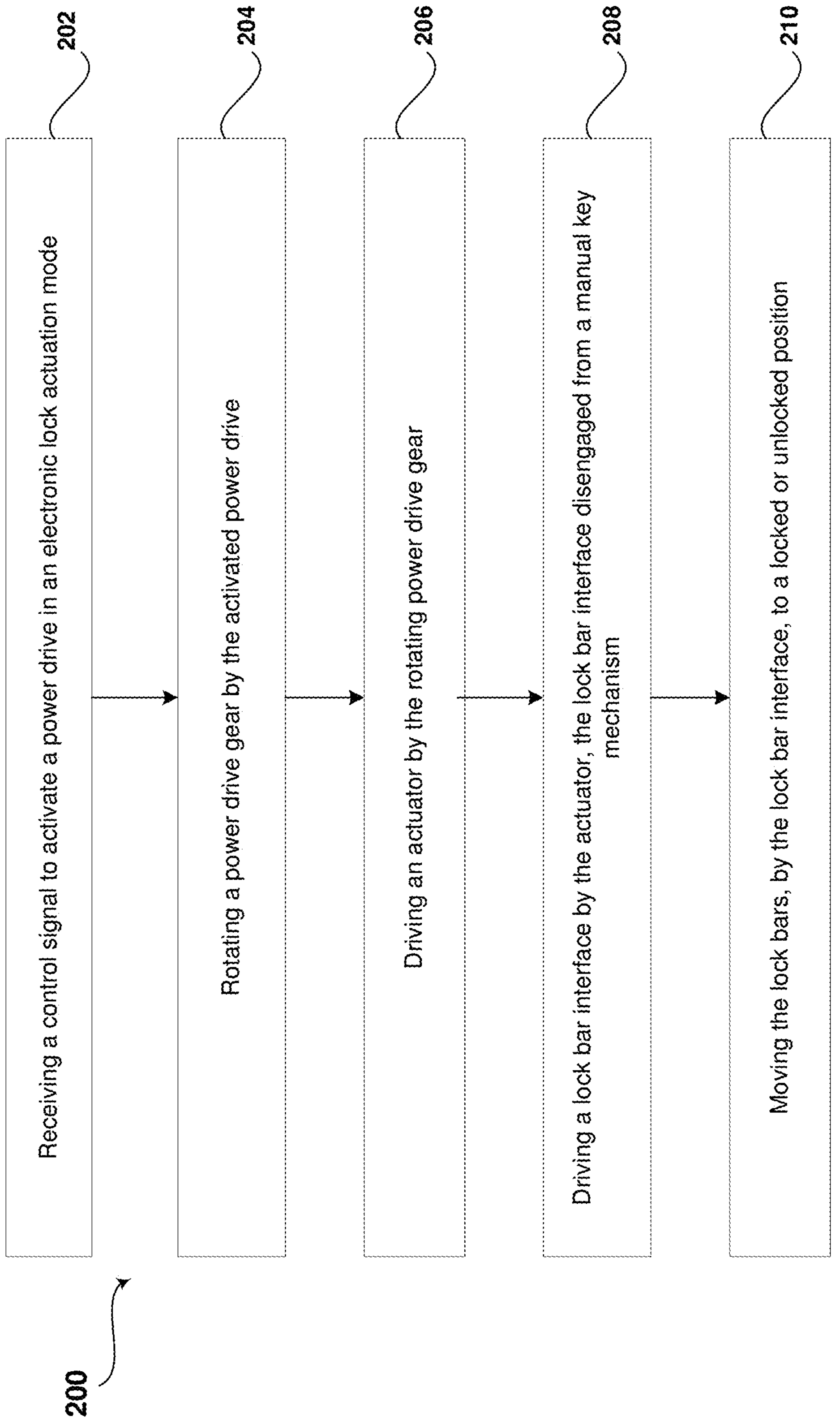
FIG. 6 is a flow diagram that illustrates exemplary steps for moving lock bar(s) to locked or unlocked positions via an electronic lock actuation mode, in accordance with various embodiments.

FIG. 6 is a flow diagram that illustrates exemplary steps 202-210 for moving lock bar(s) 102 to locked or unlocked positions via an electronic lock actuation mode, in accordance with various embodiments. Referring to FIG. 6, there is shown a flow chart 200 comprising exemplary steps 202 through 210. Certain embodiments of the present disclosure may omit one or more of the steps, and/or perform the steps in a different order than the order listed, and/or combine certain of the steps discussed below. For example, some steps may not be performed in certain embodiments. As a further example, certain steps may be performed in a different temporal order than listed below, including but not limited to simultaneously. Although the method is described with reference to the exemplary elements of the systems described above, it should be understood that other implementations are possible.

At step 202, a control signal for activating a power drive 120 of a redundant actuation lock apparatus 100 operating in an electronic lock actuation mode is received. For example, a power drive 120, which may be an electric motor, such as a DC motor, or any suitable motor, can receive a signal for turning on the motor. In various embodiments, the signal may be a wireless signal corresponding with a detected proximity of a mobile device or an activation of a button or switch on the mobile device, such as a smartphone, remote control, or any suitable mobile device. The detected proximity and/or activation of the button or switch on the mobile device may correspond with an instruction for moving the lock bar(s) 102 to a locked position or an unlocked position. The electronic lock actuation mode may correspond with the redundant actuation lock apparatus 100 having an actuator engaged with a lock bar interface 110 as illustrated, for example, in FIG. 5. In various embodiments, the redundant actuation lock apparatus 100 may be in the electronic lock actuation mode by default. For example, a flexible biasing member 138 of the actuator 130 may bias the actuator 130 to engage the lock bar interface 110. The redundant actuation lock apparatus 100 may be switched to a manual key lock actuation mode, as described below with reference to FIGS. 9-14, by rotating a mechanical key in the key input 140 to disengage the actuator 130 from the lock bar interface 110.

Figure 7:
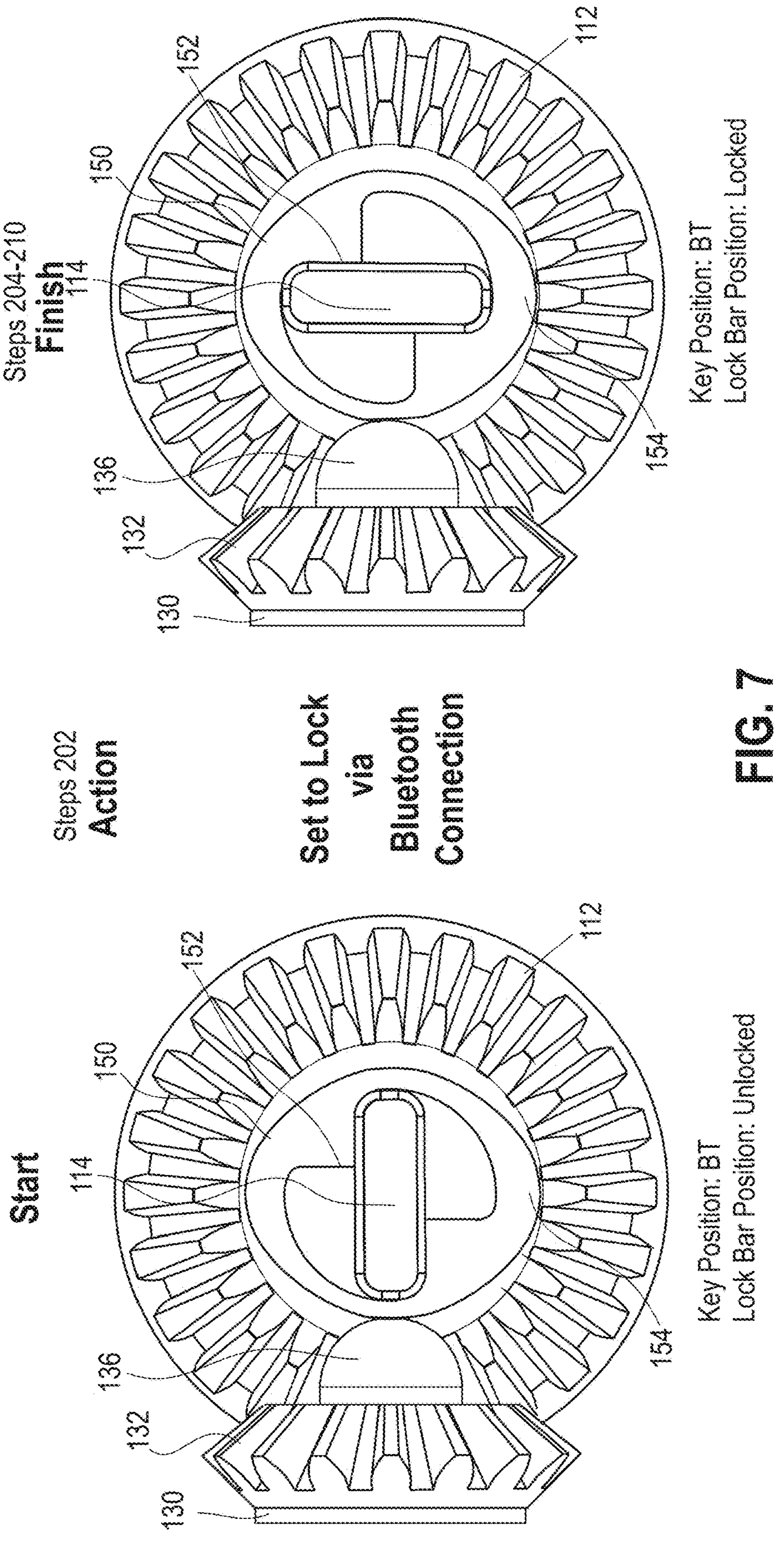
FIG. 7 is partial cross-sectional views of a portion of an exemplary redundant actuation lock apparatus transitioning from an unlocked position to a locked position via an electronic lock actuation mode, in accordance with various embodiments.
Figure 8:
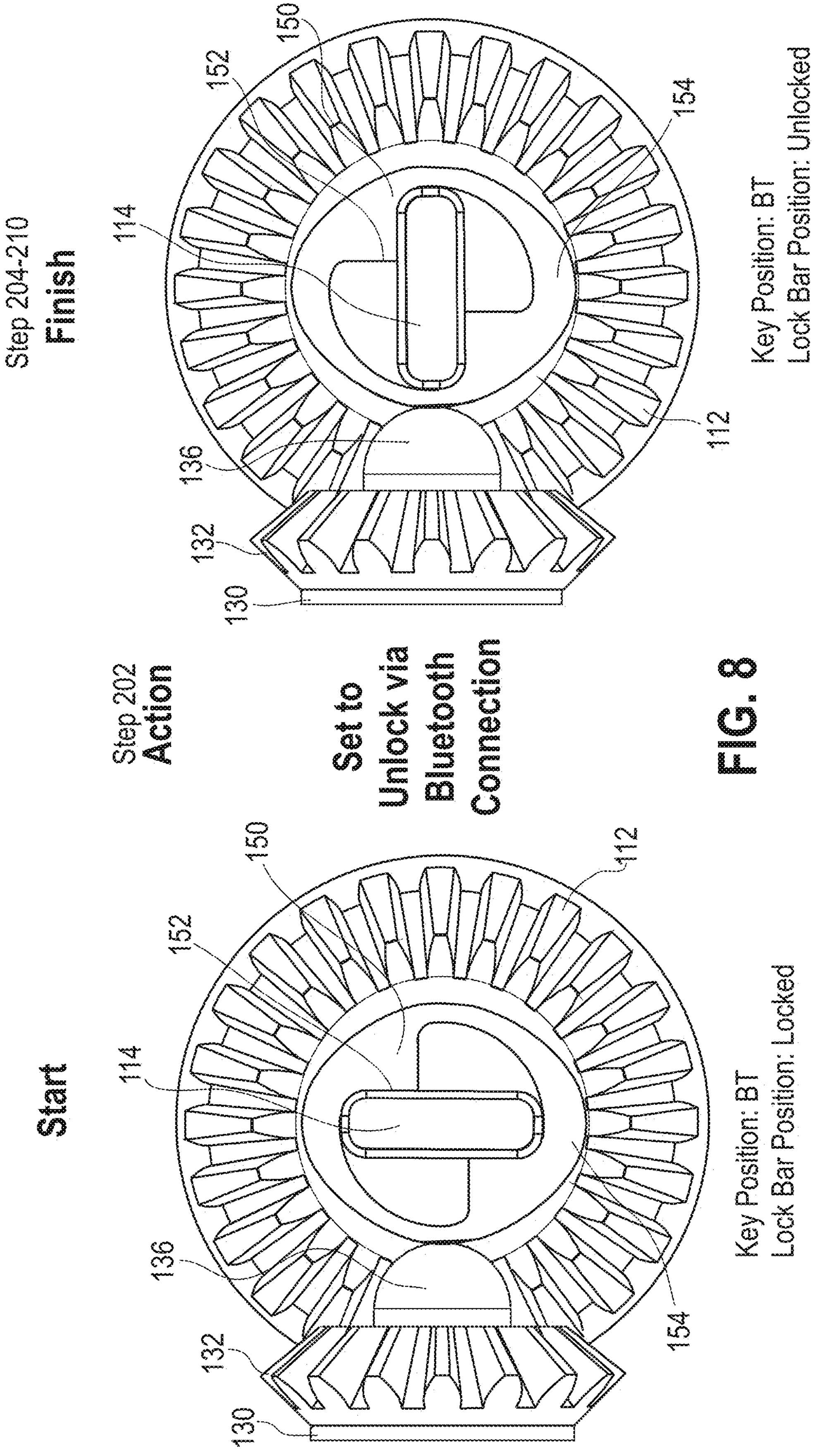
FIG. 8 is partial cross-sectional views of a portion of an exemplary redundant actuation lock apparatus transitioning from a locked position to an unlocked position via an electronic lock actuation mode, in accordance with various embodiments.

FIG. 7 is partial cross-sectional views of a portion of an exemplary redundant actuation lock apparatus 100 transitioning from an unlocked position to a locked position via an electronic lock actuation mode, in accordance with various embodiments. FIG. 8 is partial cross-sectional views of a portion of an exemplary redundant actuation lock apparatus 100 transitioning from a locked position to an unlocked position via an electronic lock actuation mode, in accordance with various embodiments. Referring to FIGS. 5-8, if a mechanical key has not been inserted into the key input 140 and/or if the key input 140 is in a position corresponding with the electronic lock actuation mode, such as a central position, the redundant actuation lock apparatus 100 may be in a start position corresponding with an electronic lock actuation mode where the actuator 130 is engaged with the lock bar interface 110 and the lock cylinder interlock 152 of the lock cylinder output 140 is disengagedly coupled to the lock bar interface 110. From this start position, the power drive 120 may be wirelessly controlled to lock or unlock the lock bar(s) 102. Although FIGS. 7 and 8 refer to a Bluetooth connection, any suitable wireless control signal is contemplated.

At step 204, the activated power drive 120 may rotate power drive gears 122. For example, the power drive 120 may rotate the gears 122 in a first direction to move the lock bar(s) 102 via the actuator 130 and the lock bar interface 110 to a locked position or rotate the gears 122 in a second direction to move the lock bar(s) 102 via the actuator 130 and the lock bar interface 110 to an unlocked position.

At step 206, the rotating power drive gears 122 may impart rotation to an actuator 130. For example, the actuator 130 may comprise gear teeth 134 that mesh with the power drive gears 122. The power drive gears 122 may rotate the actuator 130 in a first direction to move the lock bar(s) 102 via the lock bar interface 110 to a locked position or rotate the actuator 130 in a second direction to move the lock bar(s) 102 via the lock bar interface 110 to an unlocked position.

At step 208, the rotation of the actuator 130 drives the lock bar interface 110 as the lock bar interface 110 remains disengaged from the manual key mechanism 140-154. For example, the actuator 130 may comprise actuator gears 132 that mesh with gear teeth 112 of the lock bar interface 110. The actuator 130 may rotate the lock bar interface 110 in a first direction to move the lock bar(s) 102 to a locked position or rotate the lock bar interface 110 in a second direction to move the lock bar(s) 102 to an unlocked position. The rotation of the lock bar interface 110 may pivot a lock bar gear head 114 that is disengagedly coupled to an interlock 152 of the lock cylinder output 150 of the manual key mechanism 140-154. The actuator 130 is free to turn the lock bar interface 110 without the lock bar gear head 114 engaging the interlock 152 based on the shape of the interlock 152. In various embodiments, the lock bar gear head 114 of the lock bar interface 110 may pivot approximately 90 degrees, for example, from lock to unlock or vice versa without engaging the manual key mechanism 140-154.

Referring to FIG. 7, for example, the lock bar gear head 114 may start in a horizontal position corresponding with an unlocked state of the lock bar 102. In response to a wireless control signal corresponding with a "lock" action, the actuator 130 may drive the lock bar interface 100, pivoting the lock bar gear head 114 in a first direction from the horizontal position corresponding with the unlocked state of the lock bar 102 to a vertical position corresponding with a locked state of the lock bar 102 without moving the lock cylinder output 150. Accordingly, the action to "lock" the lock bar(s) 102 in the electronic lock actuation mode occurs while the manual key mechanism 140-154 is disengaged from the lock bar interface 110 such that the locking action in the electronic lock actuation mode is independent of the manual key mechanism 140-154.

As another example, referring to FIG. 8, the lock bar gear head 114 may start in a vertical position corresponding with a locked state of the lock bar 102. In response to a wireless control signal corresponding with an "unlock" action, the actuator 130 may drive the lock bar interface 100, pivoting the lock bar gear head 114 in a second direction from the vertical position corresponding with the locked state of the lock bar 102 to a horizontal position corresponding with an unlocked state of the lock bar 102 without moving the lock cylinder output 150. Accordingly, the action to "unlock" the lock bar(s) 102 in the electronic lock actuation mode occurs while the manual key mechanism 140-154 is disengaged from the lock bar interface 110 such that the unlocking action in the electronic lock actuation mode is independent of the manual key mechanism 140-154.

Although FIGS. 7 and 8 illustrate the locked position corresponding with the lock bar gear head 114 being in a vertical orientation and the unlocked position corresponding with the lock bar gear head 114 being in a horizontal orientation, the scope of the various embodiments are not so limited. Instead, any suitable orientation may be associated with each of the locked and unlocked positions.

Referring again to FIG. 6, at step 210, the lock bar(s) 102 are moved by the lock bar interface 110 to a locked or unlocked position. For example, the power drive 120 may operate in a first direction to lock the lock bar(s) 102 and in a second direction to unlock the lock bar(s) 102 based on the received control signal.

Figure 9:
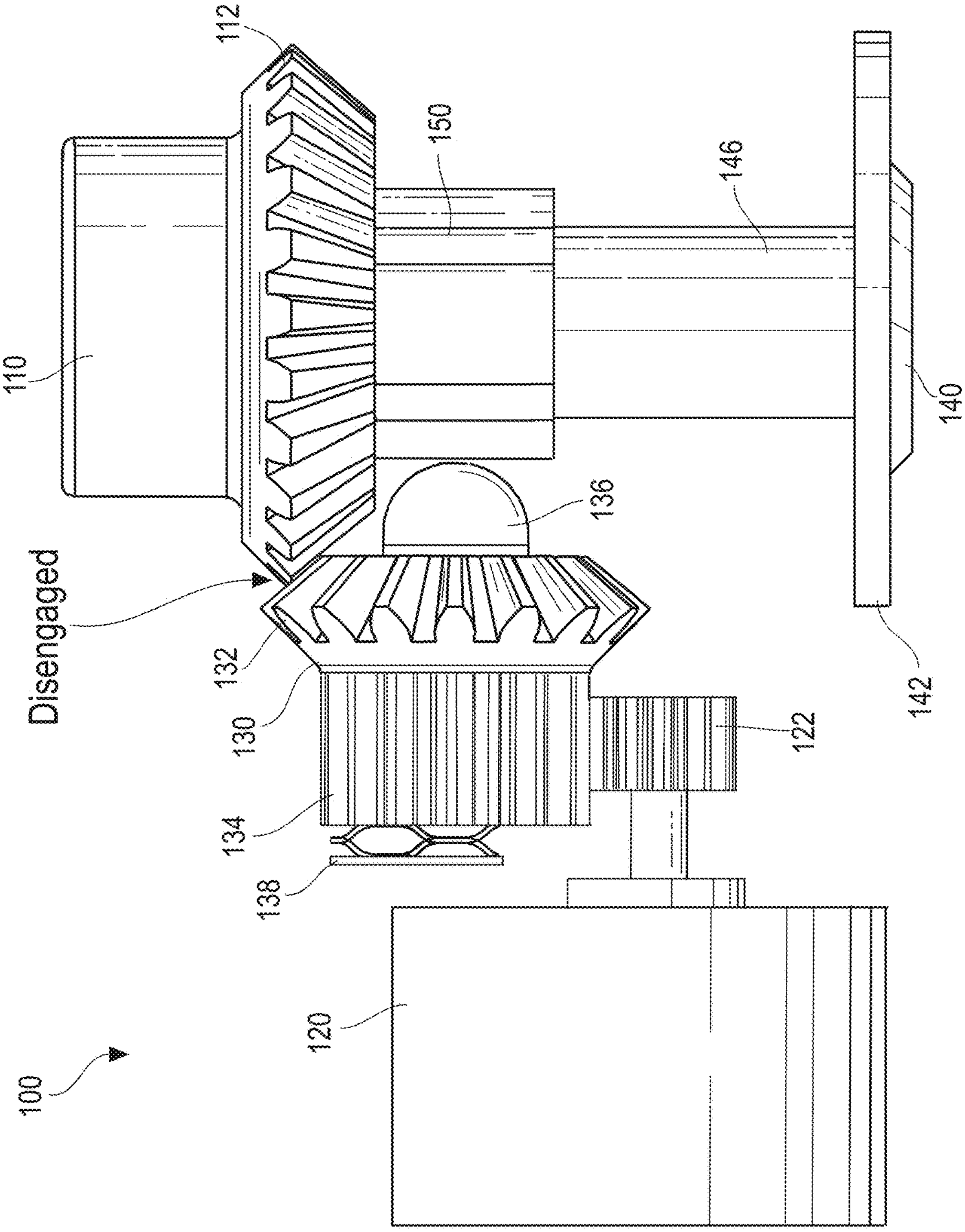
FIG. 9 is a top view of an exemplary redundant actuation lock apparatus having an actuator disengaged from the lock bar interface, in accordance with various embodiments.

FIG. 9 is a top view of an exemplary redundant actuation lock apparatus 100 having an actuator 130 disengaged from the lock bar interface 110, in accordance with various embodiments. Referring to FIG. 9, the redundant actuation lock apparatus 100 comprises a manual key lock mechanism 140-154 engaged with the lock bar interface 110 and an electronic lock mechanism 120-138 disengaged from the lock bar interface 110 in an manual key lock actuation mode. The manual key lock mechanism 140-154 may comprise a key input 140 at one end of a lock cylinder 146 and a lock cylinder output 150 at an opposite end of the lock cylinder 146. The key input 140 and lock cylinder 146 may be coupled to an apparatus having the redundant actuation lock apparatus 100 by a key input mounting plate 142. The key input 140 may be coupled to the lock cylinder output 150 by one or more bolts extending through a hollow center of the lock cylinder 146. The key input 140 may comprise a plug having a key slot, the plug rotatable by a key inserted in the key slot to pivot the lock cylinder output 150. The lock cylinder output 150 may be disengageably coupled to the lock bar interface 110. For example, the lock cylinder output 150 may comprise an interior interlock 152 and an exterior cam 154. The interior interlock 152 may comprise a shape configured to disengageably mate with a lock bar gear head 114 of the lock bar interface 110. The exterior cam 154 may comprise a shape configured to disengage the electronic lock mechanism 120-138 from the lock bar interface 110.

For example, rotation of a mechanical key at the key slot 140 may rotate the lock cylinder output 150. As the lock cylinder output 150 rotates, the exterior cam 154 may push a decoupling device 136 of an actuator 130 of the electronic lock mechanism 120-138. The force exerted by the exterior cam 154 on the decoupling device 136 may cause actuator gear teeth 132 to decouple from lock bar interface gear teeth 112 such that the lock bar interface 110 becomes disengaged from the electronic lock mechanism 120-138. Subsequently to and/or concurrently and/or simultaneously with the disengagement of the electronic lock mechanism 120-138 from the lock bar interface 110, the interior interlock 152 of the lock cylinder output 150 engages the lock bar gear head 114 and drives the lock bar interface 110 in a first direction to lock the lock bar(s) 102 or in a second direction to unlock the lock bar(s) 102, depending on the direction the mechanical key is turned at the key input 140.

In various embodiments, the redundant actuation lock apparatus 100 may be in the electronic lock actuation mode, as shown in FIG. 5, by default. For example, the redundant actuation lock apparatus 100 may be in electronic lock actuation mode if the actuator 130 is engaged with the lock bar interface 110. The rotation of a mechanical key in the key input 140 may set the redundant lock apparatus to a manual key lock actuation mode by disengaging the actuator 130 from the lock bar interface 110 as illustrated in FIG. 9.

The electronic lock mechanism 120-138 comprises a power drive 120 and an actuator 130. The power drive 120 may be wirelessly controlled to drive the actuator 130, which drives the lock bar interface 110 to lock or unlock the lock bar(s) 102 if the actuator 130 is engaged with the lock bar interface. The power drive 120 may comprise a power drive gear 122 that may be rotated by the power drive 120 in first and second directions. The actuator 130 may comprise gear teeth 134 for meshing with the power drive gear 122. The actuator 130 may comprise gear teeth 132 that may mesh with gear teeth 112 of the lock bar interface 110 to drive the lock bar interface 110 if the actuator 130 is engaged with the lock bar interface. The actuator 130 may comprise a flexible biasing member 138 for biasing the actuator 130 to engagement with the lock bar interface 110. The actuator 130 may comprise a decoupling device 136 used to disengage the actuator 130 from the lock bar interface 110. For example, a force received at the decoupling device 136 that exceeds a bias threshold of the flexible biasing member 138 may push the actuator 130 away from the lock bar interface 110 to disengage the actuator gear teeth 132 and the lock bar interface gear teeth 112 as illustrated in FIG. 9.

The exemplary redundant actuation lock apparatus 100 illustrated in FIG. 9 shares various characteristics with the exemplary redundant actuation lock apparatus 100 illustrated in FIGS. 1-5, 7, and 8 as described above.

Figure 10:
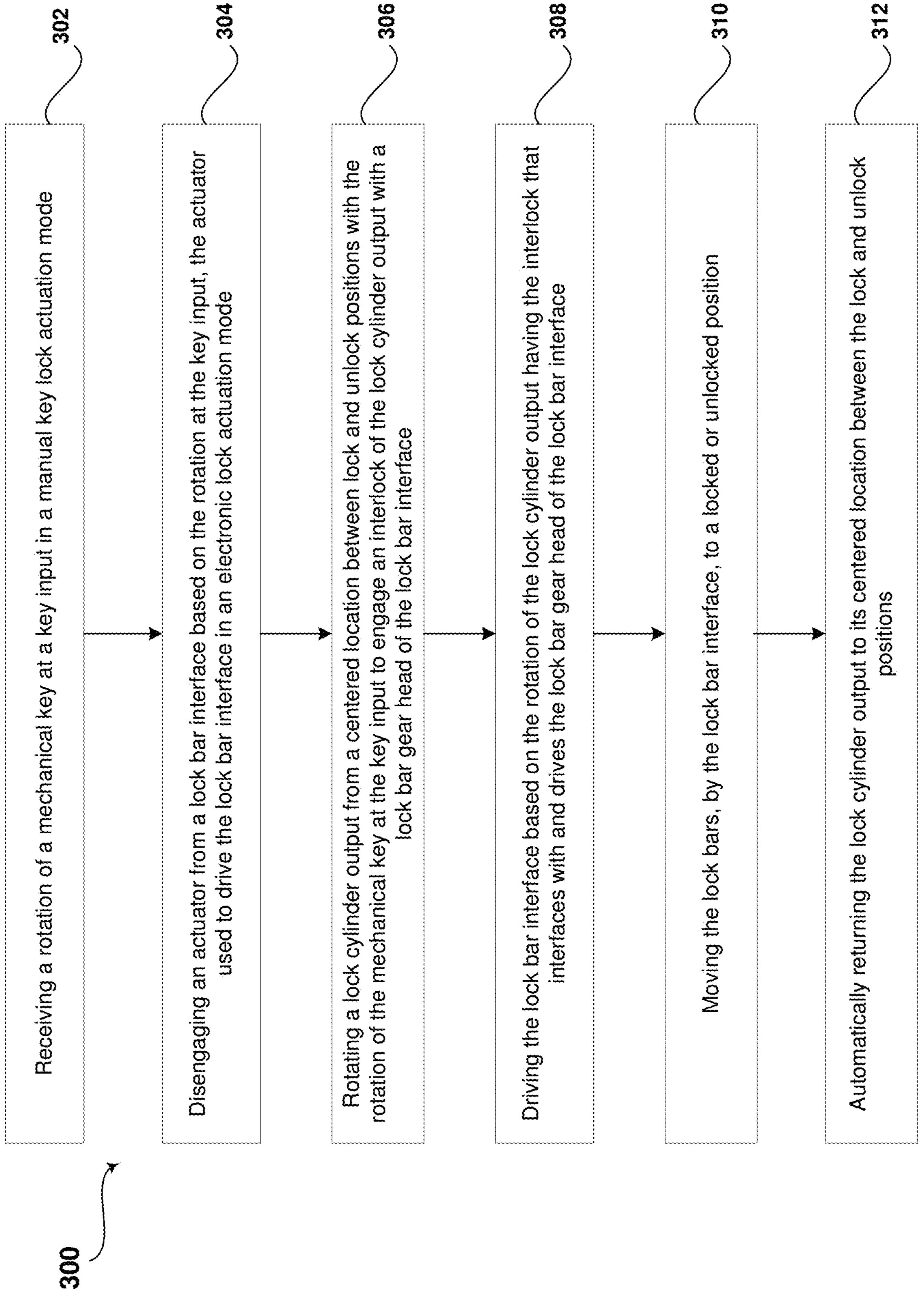
FIG. 10 is a flow diagram that illustrates exemplary steps for moving lock bar(s) to locked or unlocked positions via a manual key lock actuation mode, in accordance with various embodiments.

FIG. 10 is a flow diagram 300 that illustrates exemplary steps 302-312 for moving lock bar(s) 102 to locked or unlocked positions via a manual key lock actuation mode, in accordance with various embodiments. Referring to FIG. 10, there is shown a flow chart 300 comprising exemplary steps 302 through 312. Certain embodiments of the present disclosure may omit one or more of the steps, and/or perform the steps in a different order than the order listed, and/or combine certain of the steps discussed below. For example, some steps may not be performed in certain embodiments. As a further example, certain steps may be performed in a different temporal order than listed below, including but not limited to simultaneously. Although the method is described with reference to the exemplary elements of the systems described above, it should be understood that other implementations are possible.

At step 302, a manual key rotation of a mechanical key inserted into a key input 140 of a redundant actuation lock apparatus 100 is received. For example, the key input 140 may comprise a plug having a slot for receiving a mechanical key. The key input 140 may extend into a lock cylinder 146 at a first end of the lock cylinder 146. The rotation of the mechanical key at the key input 140 may rotate a lock cylinder output 150 pivotally coupled to a second end of the lock cylinder 146. For example, the key input 140 and lock cylinder output 150 may be coupled by one or more bolts extending through the lock cylinder 146 such that rotational motion of the key input 140 is translated to rotational motion of the lock cylinder output 150.

In various embodiments, the redundant actuation lock apparatus 100 may be in the electronic lock actuation mode by default. For example, a flexible biasing member 138 of the actuator 130 may bias the actuator 130 to engage the lock bar interface 110. The redundant actuation lock apparatus 100 may be switched to a manual key lock actuation mode by rotating the mechanical key in the key input 140 to disengage the actuator 130 from the lock bar interface 110. The manual key lock actuation mode may correspond with the redundant actuation lock apparatus 100 having the actuator 130 disengaged from the lock bar interface 110 as illustrated, for example, in FIG. 9.

Figure 11:
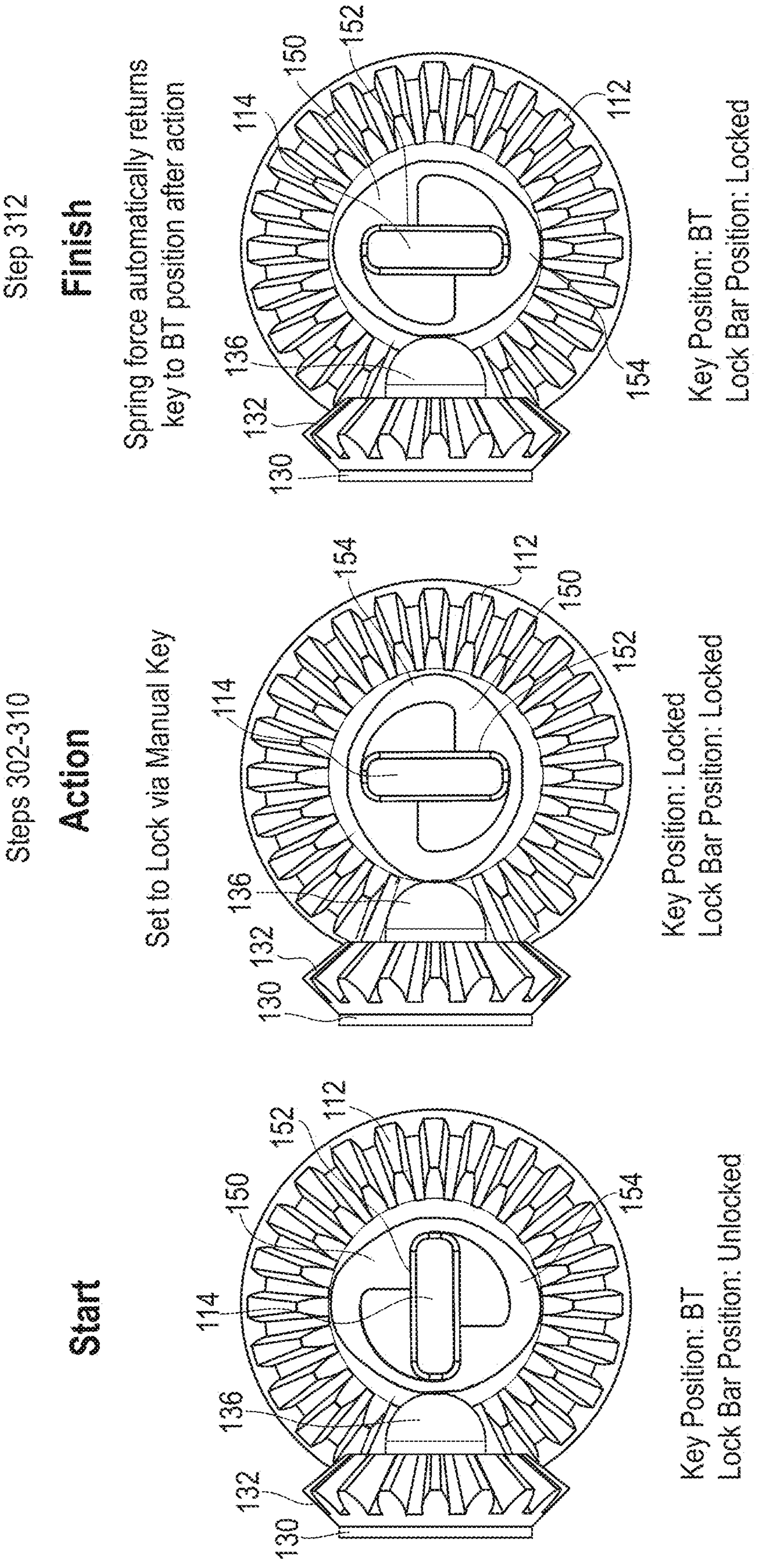
FIG. 11 is partial cross-sectional views of a portion of an exemplary redundant actuation lock apparatus having a first interlock geometry transitioning from an unlocked position to a locked position via a manual key lock actuation mode, in accordance with various embodiments.

FIG. 11 is partial cross-sectional views of a portion of an exemplary redundant actuation lock apparatus 100 having a first interlock geometry transitioning from an unlocked position to a locked position via a manual key lock actuation mode, in accordance with various embodiments. FIG. 12 is partial cross-sectional views of a portion of an exemplary redundant actuation lock apparatus 100 having a first interlock geometry transitioning from a locked position to an unlocked position via a manual key lock actuation mode. FIG. 13 is partial cross-sectional views of a portion of an exemplary redundant actuation lock apparatus 100 having a second interlock geometry transitioning from an unlocked position to a locked position via a manual key lock actuation mode. FIG. 14 is partial cross-sectional views of a portion of an exemplary redundant actuation lock apparatus having a second interlock geometry transitioning from a locked position to an unlocked position via a manual key lock actuation mode. Referring to FIGS. 9-14, if a mechanical key has not been inserted into the key input 140 and/or if the key input 140 is in a position corresponding with the electronic lock actuation mode, such as a central position, the redundant actuation lock apparatus 100 may be in a start position corresponding with an electronic lock actuation mode where the actuator 130 is engaged with the lock bar interface 110 and the lock cylinder interlock 152 of the lock cylinder output 140 is disengagedly coupled to the lock bar interface 110. From this start position illustrated, for example, as the first image in each series of images shown in FIGS. 11-14, a mechanical key may be inserted into the key input 140 of the redundant actuation lock apparatus 100 and rotated to transition into the manual key lock actuation mode.

At step 304, the actuator 130 used to drive the lock bar interface 110 in the electronic lock actuation mode is disengaged from the lock bar interface 110 based on the rotation of the mechanical key at the key input 140. For example, the rotation of the mechanical key at the key input 140 at a first end of a lock cylinder 146 may rotate a lock cylinder output 150 pivotally coupled to a second end of the lock cylinder 146. The lock cylinder output 150 may include an external cam 154 operable to apply a force to an actuator decoupling device 136 to push the actuator 130 away from and disengage the actuator 130 from the lock bar interface 110 as the lock cylinder output 150 is rotated by the mechanical key.

At step 306, the lock cylinder output 150 is rotated with the rotation of the mechanical key at the key input 140 from a centered location between lock and unlock positions to engage an interlock 152 of the lock cylinder output 150 with a lock bar gear head 114 of the lock bar interface 110. For example, the lock bar gear head 114 of the lock bar interface 110 may be a shaft having at least two flat edges that may be engaged and driven by a lock cylinder interlock 152 of the lock cylinder output 150. The interlock 152 may comprise a shape having a plurality of edges for engaging and driving the flat edges of the lock bar gear head 114 shaft such that the lock bar interface 110 rotates to lock or unlock the lock bar(s) 102. In various embodiments, as the mechanical key is turned, the interlock 152 rotates with the lock cylinder output 150 such that one or more of the plurality of edges of the interlock 152 engages the lock bar gear head 114 shaft of the lock bar interface 110.

At step 308, the rotation of the lock cylinder output 150 drives the lock bar interface 110 as the lock bar interface 110 remains disengaged from the electronic lock mechanism 120-138. For example, one or more of the plurality of edges of the interlock 152 of the lock cylinder output 150 may drive the lock bar gear head 114 in a first direction if the lock cylinder output 150 is rotated by a mechanical key in the first direction to lock the lock bar(s) 102. As another example, a different one or more of the plurality of edges of the interlock 152 of the lock cylinder output 150 may engage and drive the lock bar gear head 114 in a second direction if the lock cylinder output 150 is rotated by the mechanical key in the second direction to unlock the lock bar(s) 102. FIGS. 11 and 12 show a first exemplary embodiment of an exemplary shape of the interlock 152 and FIGS. 13 and 14 illustrate a second exemplary embodiment of an exemplary shape of the interlock 152.

Referring to FIGS. 11 and 12, the interlock 152 may rotate approximately 90 degrees to at least substantially concurrently or simultaneously disengage the actuator 130 from the lock bar interface (step 304), engage the interlock 152 with the lock bar gear head 114 (step 306), and rotate the lock bar interface (step 308). Referring to FIGS. 13 and 14, the interlock 152 may rotate approximately 110 degrees. For example, the first approximately 20 degrees of rotation may disengage the actuator 130 from the lock bar interface (step 304). The vertical reference line shows the actuator 130 being pushed away and disengaged from the lock bar interface 110 as the cam 154 rotates and pushes the actuator decoupling device 136. After the disengagement of the electronic lock mechanism 120-138 from the lock bar interface 110, the next approximately 90 degrees of rotation of the interlock 152 may engage the interlock 152 with the lock bar gear head 114 (step 306) and rotate the lock bar interface (step 308). In the embodiments illustrated in FIGS. 11-14, the lock bar gear head 114 of the lock bar interface 110 may pivot approximately 90 degrees, for example, from lock to unlock or vice versa. The interlock 152 of the lock cylinder output 150 is free to turn the lock bar interface 110 without the actuator 130 of the electronic lock mechanism 120-138 engaging the lock bar interface 110.

Referring again to FIG. 10, at step 310, the lock bar(s) 102 are moved by the lock bar interface 110 to a locked or unlocked position. For example, the mechanical key may be rotated in a first direction to move the interlock 152 of the lock cylinder output 150 and the lock bar gear head 114 of the lock bar interface 110 in a first direction, as illustrated in FIGS. 11 and 13, to lock the lock bar(s) 102. As another example, the mechanical key may be rotated in a second direction to move the interlock 152 of the lock cylinder output 150 and the lock bar gear head 114 of the lock bar interface 110 in a second direction, as illustrated in FIGS. 12 and 14, to unlock the lock bar(s) 102.

At step 312, the lock cylinder output 150 may be returned to its centered location between the lock and unlock positions or otherwise original location. For example, the manual lock mechanism 140-154 may be spring loaded to return the lock cylinder output 150, including the internal interlock 152 and external cam 154, to its original position. Accordingly, as shown for example in the last image of each series in FIGS. 11 and 12, the actuator 130 returns to a default engaged state with the lock bar interface 110 corresponding with the electronic lock actuation mode. Furthermore, the cam 154 and interlock 152 are in position to respectively disengage the actuator 130 from the lock bar interface 110 and transition from the locked state to the unlocked state, or vice versa, in response to the rotation of the mechanical key. Although not specifically shown in FIGS. 13 and 14, once the box is locked or unlocked, respectively, the lock cylinder output 150 may similarly return to the original position as shown in the first image of both of the series of images of FIGS. 13 and 14.

Figure 15:
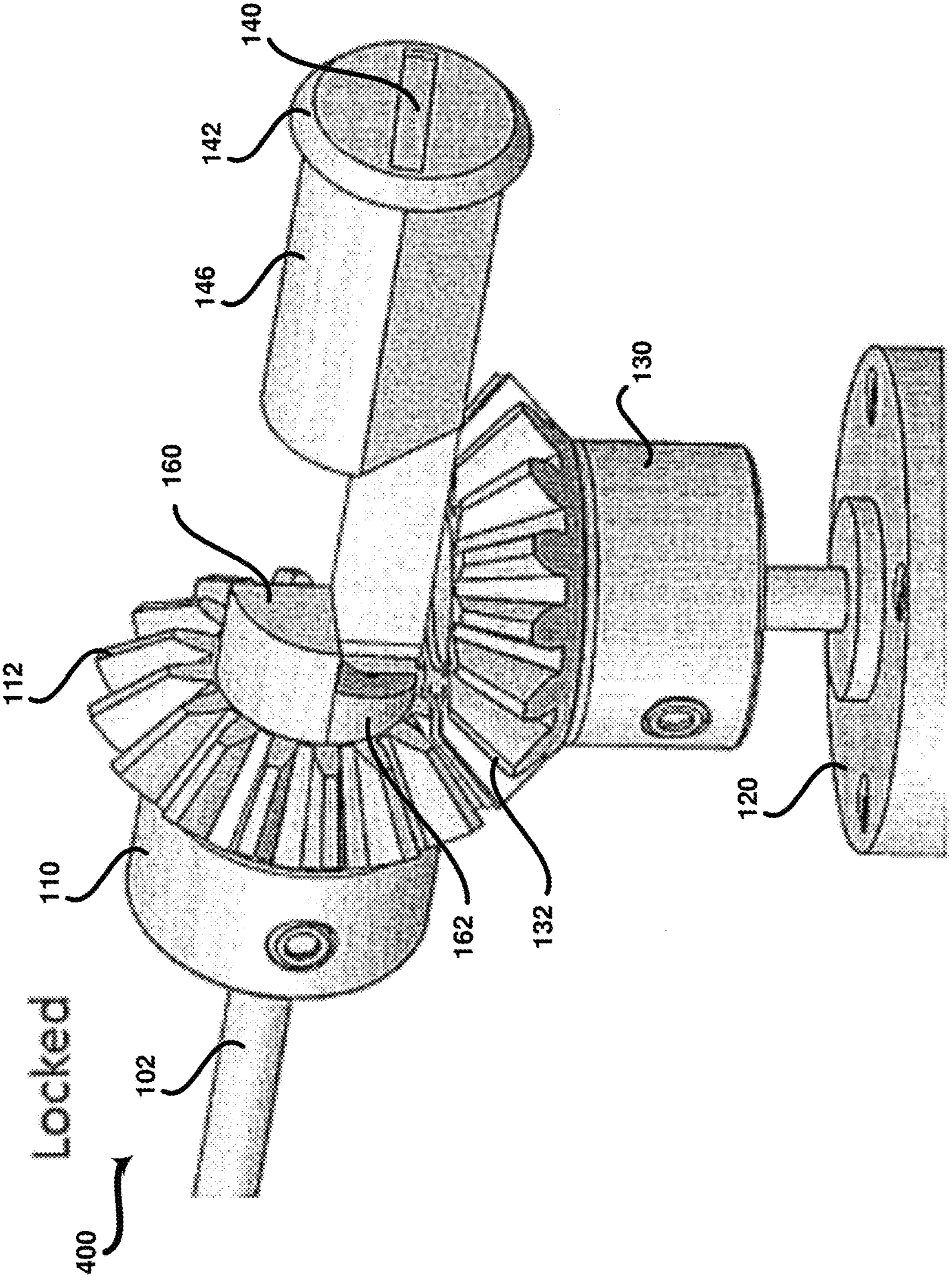
FIG. 15 is a perspective view of an alternative exemplary redundant actuation lock apparatus in a locked position, in accordance with various embodiments.
Figure 16:
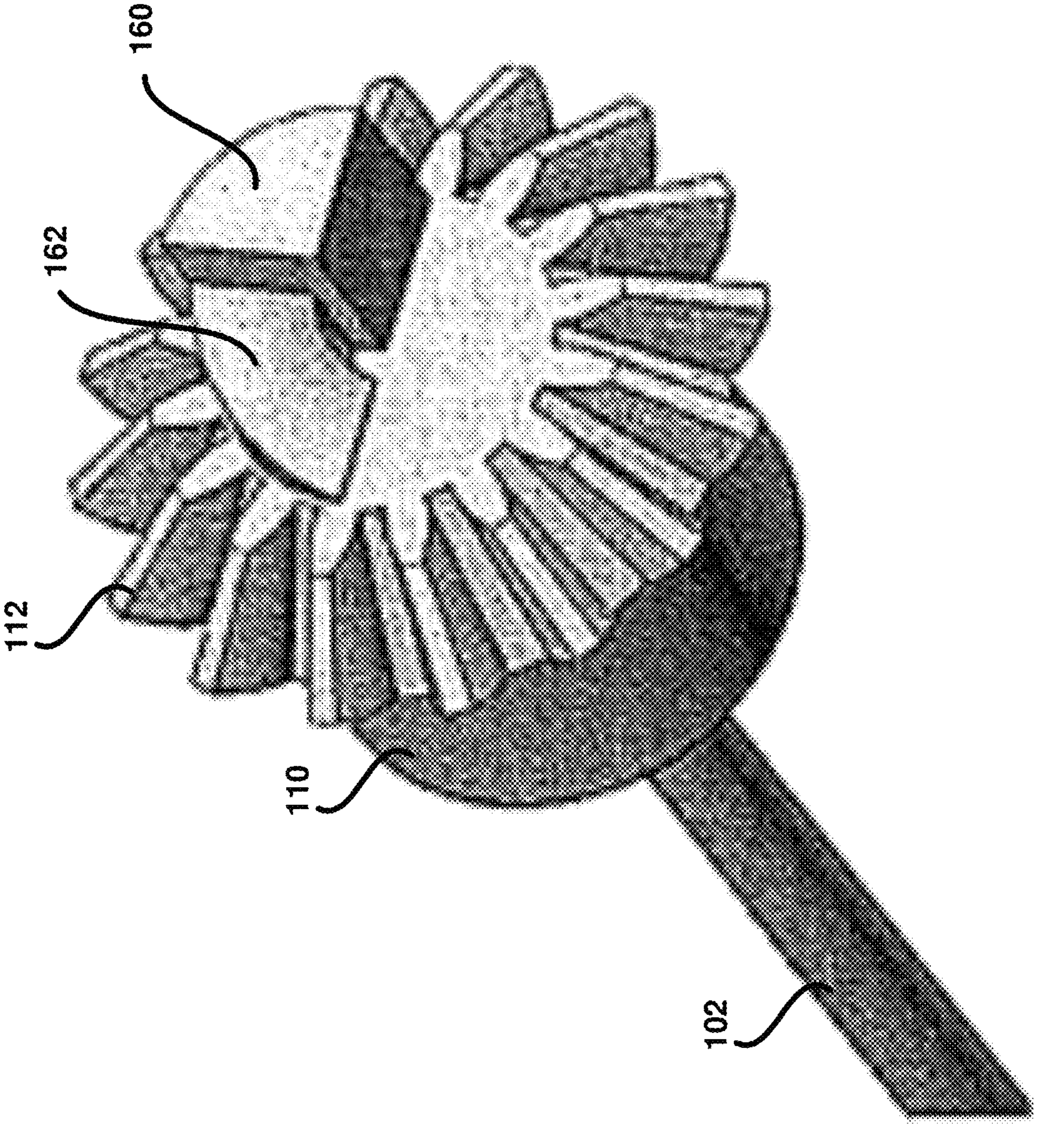
FIG. 16 is a perspective view of an exemplary ramp and stop of an exemplary lock bar interface of the alternative exemplary redundant actuation lock apparatus, in accordance with various embodiments.
Figure 17:
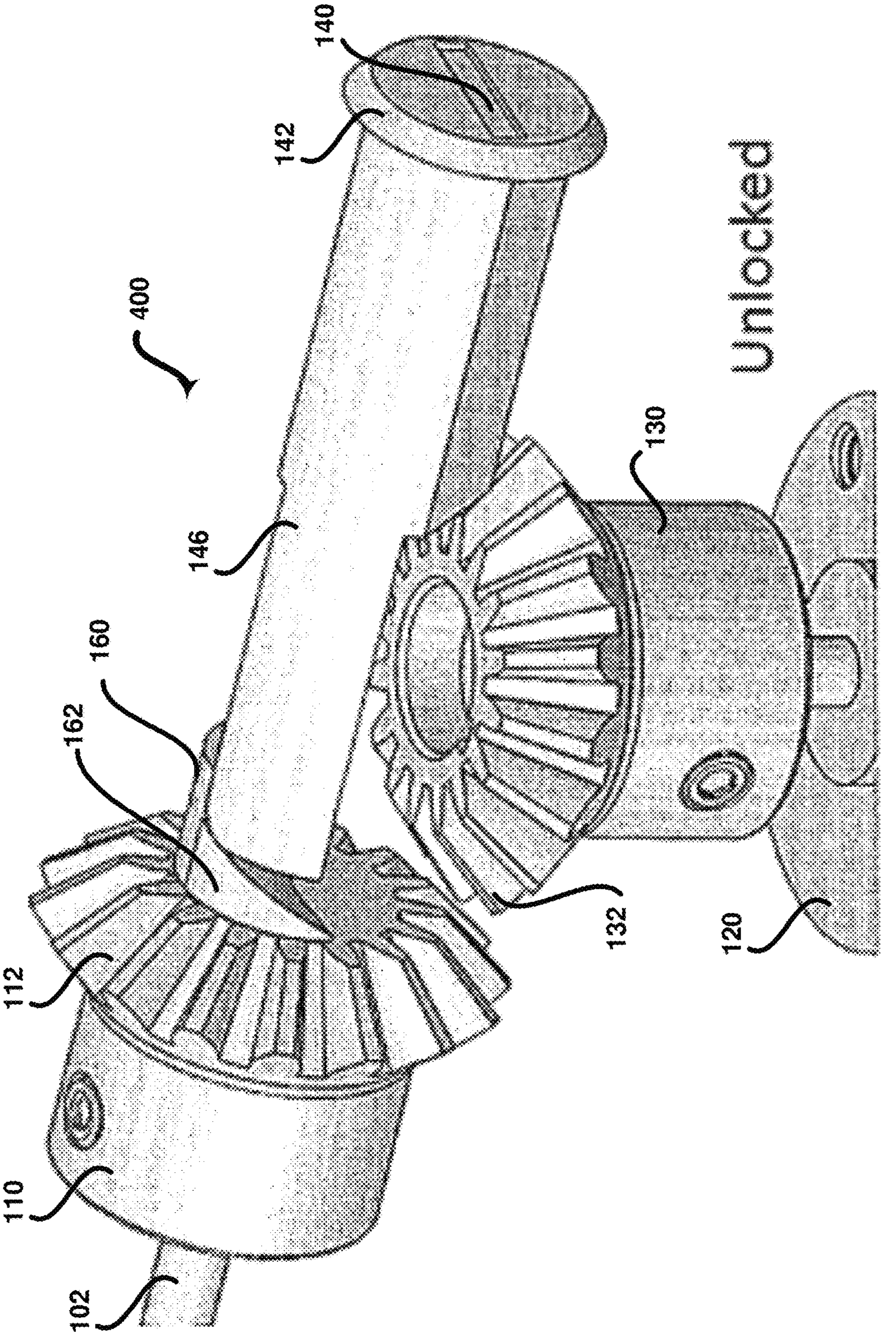
FIG. 17 is a perspective view of an alternative exemplary redundant actuation lock apparatus in an unlocked position, in accordance with various embodiments.
Figure 18:
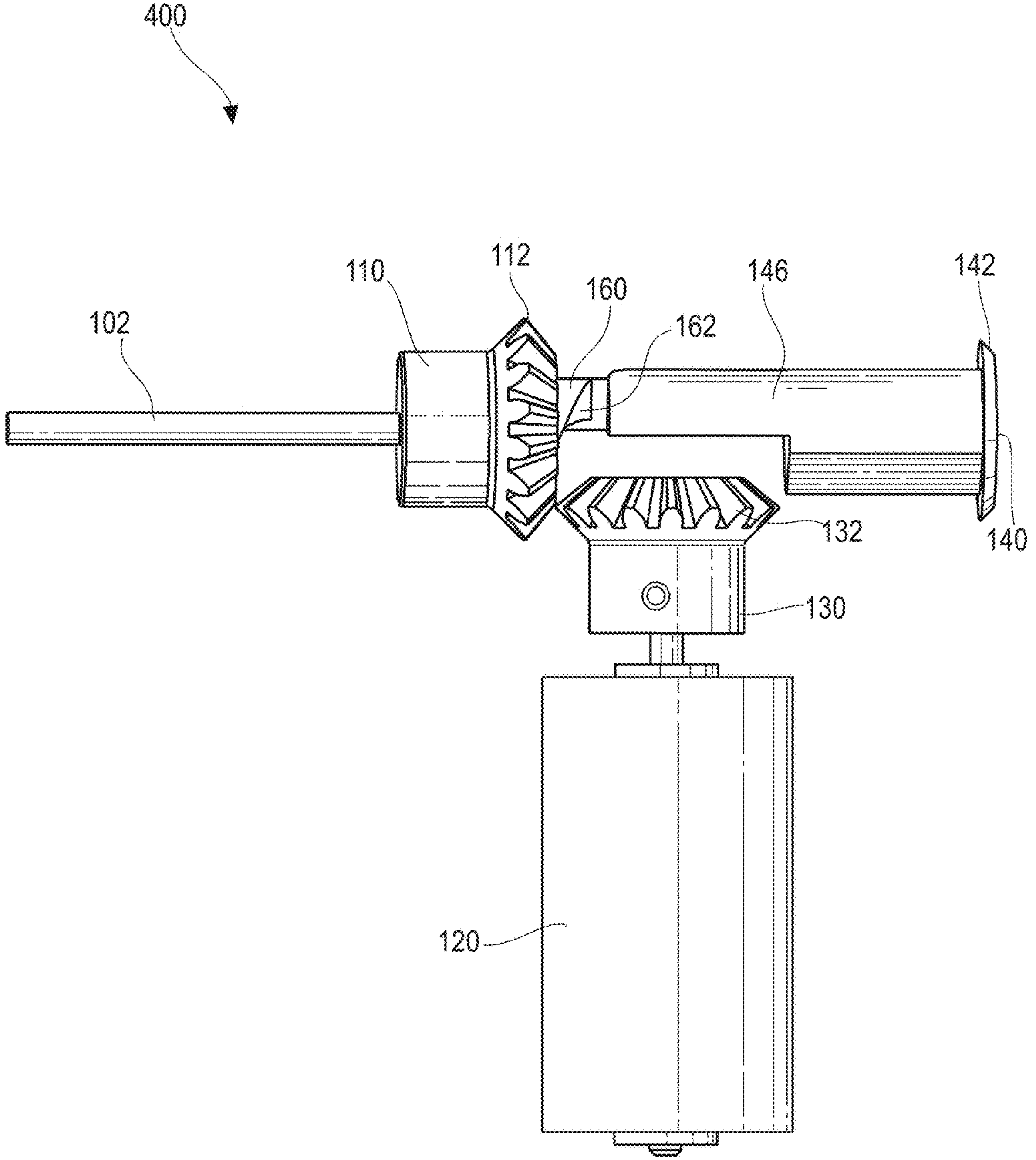
FIG. 18 is a side view of an alternative exemplary redundant actuation lock apparatus in an unlocked position, in accordance with various embodiments.

FIG. 15 is a perspective view of an alternative exemplary redundant actuation lock apparatus 400 in a locked position, in accordance with various embodiments. FIG. 16 is a perspective view of an exemplary ramp 162 and stop 160 of an exemplary lock bar interface 110 of the alternative exemplary redundant actuation lock apparatus 400. FIG. 17 is a perspective view of an alternative exemplary redundant actuation lock apparatus 400 in an unlocked position. FIG. 18 is a side view of an alternate exemplary redundant actuation lock apparatus 400 in an unlocked position.

Referring to FIGS. 15-18, the alternative redundant actuation lock apparatus 400 may comprise a lock bar interface 110, an electronic lock mechanism 120-132, and a manual key lock mechanism 140-146. The lock bar interface 110 is configured to move one or more lock bars 102 between locked and unlocked positions. The lock bar interface 110 may be engaged with the electronic lock mechanism 120-132 and disengaged from the manual key lock mechanism 140-146 if operating in an electronic lock actuation mode to lock and/or unlock the lock bar(s) 102. The lock bar interface 110 may be engaged with the manual key lock mechanism 140-146 and disengaged from the electronic lock mechanism 120-132 if operating in a manual key lock actuation mode to lock and/or unlock the lock bar(s) 102.

FIG. 16 is a perspective view of an exemplary lock bar interface 110. Referring to FIG. 16, the lock bar interface 110 may comprise gear teeth 112, a ramp 162, and a stop 160. The lock bar gear teeth 112 may be configured to disengageably couple with an actuator 130 of the electronic lock mechanism 120-132 to lock and/or unlock the lock bar(s) 102 in the electronic lock actuation mode. The lock bar gear teeth 112 may, for example, mesh with actuator gear teeth 132 if engaged such that the actuator 130 may drive the lock bar interface 110. The ramp 162 and stop 160 may be configured to disengageably couple with a lock cylinder 146 of the manual key lock mechanism 140-146 to lock and/or unlock the lock bar(s) 102 in the manual key lock actuation mode. The ramp 162 may be configured to disengage the lock bar interface 110 from the actuator 130 by pushing the lock bar interface 110 away from the actuator 130. For example, as a mechanical key rotates a key input 140 and a lock cylinder 146 coupled to the key input 140, the lock cylinder 146 may slide across the ramp 162 to push the lock bar interface 110. The stop 160 may be configured to engage the lock cylinder 146 such that the lock cylinder 146 may drive the lock bar interface 110 to, for example, move the lock bar(s) 102 from a locked position as illustrated in FIG. 15 to an unlocked position as illustrated in FIGS. 17 and 18.

Referring again to FIGS. 15-18, the electronic lock mechanism 120-132 may comprise a power drive 120 and an actuator 130. The primary power drive 120 may be an electric motor, such as a DC motor, or any suitable motor. The primary power drive 120 may be configured to receive a control signal and in response, may be operable to drive the actuator 130 in one of a first direction to interact with the lock bar interface 110 to lock the lock bar(s) 102 or in a second direction to interact with the lock bar interface 110 to unlock the lock bar(s) 102. The actuator 130 may comprise an interface 132 to the lock bar interface 110. The interface 132 to the lock bar interface 110 may be, for example, gear teeth for meshing with the lock bar gear teeth 112.

The manual key lock mechanism 140-146 may comprise a key input 140 and a lock cylinder 146. The key input 140 may be a plug having a slot for accepting a mechanical key. The plug may pivot with rotation of an inserted key and drive the lock cylinder 146. The lock cylinder 146 may have a first end coupled to the key input 140 and a second end operable to drive the lock bar interface 110. The key input 140 and lock cylinder 146 may be pivotably mounted to a device, such as a toolbox or any suitable apparatus utilizing a locking mechanism, by a mounting plate 142.

Various embodiments provide a redundant actuation lock apparatus 100 comprising a lock bar interface 110, an electronic lock mechanism 120-138, and a manual key lock mechanism 140-154. The lock bar interface 110 may be configured to manipulate one or more lock bars 102 into one of a locked position and an unlocked position. The electronic lock mechanism 120-138 may comprise an actuator 130 and a power drive 120. The actuator 130 may be disengageably coupled to the lock bar interface 110. The actuator 130 may be configured to drive the lock bar interface 110 to manipulate the one or more lock bars 102. The actuator may be engaged to the lock bar interface 110 in an electronic lock actuation mode. The actuator 130 may be disengaged from the lock bar interface 110 in a manual key lock actuation mode. The power drive 120 may be coupled to the actuator 130 and configured to drive the actuator 130 to drive the lock bar interface 110 in response to a control signal. The manual key lock mechanism 140-154 may comprise a key input 140, a lock cylinder 146, and a lock cylinder output 150. The key input 140 may be configured to receive a mechanical key. The key input 140 may be rotatable with rotation of the mechanical key. The rotation of the mechanical key may disengage the actuator 130 from the lock bar interface 110 to transition from the electronic lock actuation mode to the manual key lock actuation mode. The lock cylinder 146 may include a first end and a second end. The key input 140 may be provided at the first end of the lock cylinder 146. The lock cylinder output 150 may be provided at the second end of the lock cylinder 146 and may be disengageably coupled to the lock bar interface 110. The lock cylinder output 150 may be rotatable with the rotation of the mechanical key at the key input 140. The lock cylinder output 150 may be configured to engage and drive the lock bar interface 110 to manipulate the one or more lock bars 102. The lock cylinder output 150 may be engaged to the lock bar interface 110 in the manual key lock actuation mode. The lock cylinder output 150 may be disengaged from the lock bar interface 110 in the electronic lock actuation mode.

In certain embodiments, the actuator 130 comprises gear teeth 132 configured to mesh with gear teeth 112 of the lock bar interface 110 to drive the lock bar interface 110. In a representative embodiment, the control signal is generated in response to a wireless signal transmitted by a mobile device. In various embodiments, the power drive 120 comprises a power drive gear 122. The power drive gear 122 may be rotatable by the power drive 120 to drive the actuator 130. The actuator 130 may comprise a gear 134 configured to mesh with the power drive gear 122. In certain embodiments, the power drive 120 rotates the power drive gear 122 in a first direction to drive the actuator 130 to drive the lock bar interface 110 to manipulate one or more lock bars 102 into the locked position. In a representative embodiment, the power drive 120 rotates the power drive gear 122 in a second direction to drive the actuator 130 to drive the lock bar interface 110 to manipulate one or more lock bars 102 into the unlocked position. In various embodiments, the power drive 120 is an electric motor. In certain embodiments, the electric motor is a DC motor.

In a representative embodiment, the actuator 130 comprises a flexible biasing member 138 configured to bias the gear teeth 132 of the actuator 130 into engagement with the gear teeth 112 of the lock bar interface 110. In various embodiments, the flexible biasing member 138 is a spring. In certain embodiments, the actuator 130 comprises a decoupling device 136. A force applied to the decoupling device 136 that exceeds a bias force applied by the spring 138 may disengage the gear teeth 132 of the actuator 130 from the gear teeth 112 of the lock bar interface 110. In a representative embodiment, the lock cylinder output 150 is a sleeve comprising an interior and an exterior. The exterior of the sleeve comprises a cam 154 configured to provide the force to the decoupling device 136 that exceed the bias force applied by the spring 138 if the lock cylinder output 150 is rotated based on the rotation of the mechanical key at the key input 140.

In various embodiments, the lock bar interface 110 comprises a shaft 114 having a plurality of flat edges configured for engagement by the lock cylinder output 150. In certain embodiments, the lock cylinder output 150 is a sleeve comprising an interior and an exterior. The interior of the sleeve comprises an interlock 152 having a shape comprising a plurality of edges configured to engage and drive the plurality of flat edges of the shaft 114. In a representative embodiment, a first portion of the plurality of edges 152 engages and drives the plurality of flat edges of the shaft 114 to manipulate the one or more lock bars 102 into the locked position. In various embodiments, a second portion of the plurality of edges 152 engages and drives the plurality of flat edges of the shaft 114 to manipulate the one or more lock bars 102 into the unlocked position. In certain embodiments, the interlock 152 is rotated with the lock cylinder output 150 a first angular distance prior to and a second angular distance after one of the first portion and the second portion of the plurality of edges 152 engages the plurality of flat edges of the shaft 114. In a representative embodiment, the first angular distance is approximately 20 degrees and the second angular distance is approximately 90 degrees.

In various embodiments, the shaft 114 is rotatable approximately 90 degrees in a first direction to manipulate the one or more lock bars 102 into the locked position. The shaft 114 is rotatable approximately 90 degrees in a second direction to manipulate the one or more lock bars 102 into the unlocked position. In certain embodiments, the manual key lock mechanism 140-154 is spring loaded to return the lock cylinder output 150 to a default position after the mechanical key is rotated to rotate the lock cylinder output 150.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g." and "for example" set off lists of one or more non-limiting examples, instances, or illustrations. As utilized herein, a structure that is "configured" to or "operable" to perform a function requires that the structure is more than just capable of performing the function, but is actually made to perform the function, regardless of whether the function is actually performed, disabled or not enabled.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment or embodiments disclosed, but that the present invention will include all embodiments falling within the scope of the appended claims.

What is claimed is:

1. A method of operating a redundant actuation lock apparatus in a manual key lock actuation mode, the redundant actuation lock apparatus having a lock bar interface configured to manipulate one or more lock bars from a locked position to an unlocked position and from the unlocked position to the locked position, the method comprising:

receiving a rotation of a mechanical key at a key input in a manual key lock actuation mode, wherein the key input rotates with the mechanical key;

disengaging an actuator from the lock bar interface based on the rotation at the key input, the actuator configured to drive the lock bar interface in an electronic lock actuation mode;

rotating a lock cylinder output from a location between locked and unlocked positions with the rotation of the mechanical key at the key input to engage an interlock of the lock cylinder output with a lock bar gear head of the lock bar interface;

driving the lock bar interface based on the rotation of the lock cylinder output having the interlock that interfaces with and drives the lock bar gear head of the lock bar interface; and moving the one or more lock bars, by the lock bar interface, to one of the locked position and the unlocked position.

2. The method of claim 1, comprising automatically returning the lock cylinder output to the location between locked and unlocked positions.

3. The method of claim 2, wherein the location between locked and unlocked positions is a centered location.

4. The method of claim 2, comprising engaging the actuator with the lock bar interface based on the automatically returning the lock cylinder output to the location between locked and unlocked positions.

5. The method of claim 1, wherein the actuator and the lock bar interface remain disengaged during the driving the lock bar interface based on the rotation of the lock cylinder output.

6. The method of claim 1, wherein the disengaging the actuator from the lock bar interface is performed by an external cam of the lock cylinder output applying a force to an actuator decoupling device of the actuator to push the actuator away from and disengage the actuator from the lock bar interface as the lock cylinder output is rotated by the mechanical key.

7. The method of claim 1, wherein the lock bar gear head of the lock bar interface comprises a shaft having at least two flat edges operable to be engaged and driven by the interlock of the lock cylinder output.

8. The method of claim 7, wherein the interlock comprises a shape having a plurality of edges, and wherein:

- a first subset of the plurality of edges is configured to engage and drive a first one of the at least two flat edges of the shaft of the lock bar gear head such that the lock bar interface rotates to move the one or more lock bars to the locked position, and
- a second subset of the plurality of edges is configured to engage and drive a second one of the at least two flat edges of the shaft of the lock bar gear head such that the lock bar interface rotates to move the one or more lock bars to the unlocked position.

9. The method of claim 8, wherein the first subset of the plurality of edges engages and drives the first one of the at least two flat edges of the shaft of the lock bar gear head when the rotation of the mechanical key is in a first direction.

10. The method of claim 9, wherein the second subset of the plurality of edges engages and drives the second one of the at least two flat edges of the shaft of the lock bar gear head when the rotation of the mechanical key is in a second direction, opposite the first direction.

11. A method of operating a redundant actuation lock apparatus in an electronic lock actuation mode, the redundant actuation lock apparatus having a lock bar interface configured to manipulate one or more lock bars from a locked position to an unlocked position and from the unlocked position to the locked position, the method comprising:

- engaging an actuator with a lock bar interface, wherein the engaging the actuator with the lock bar interface comprises biasing, via a flexible biasing member, the actuator to engage the lock bar interface;
- receiving a control signal to activate a power drive;
- rotating a power drive gear by the activated power drive;
- driving the actuator by the rotating power drive gear;
- driving the lock bar interface by the actuator; and
- moving the one or more lock bars, by the lock bar interface, to one of the locked position and the unlocked position.

12. The method of claim 11, wherein the flexible biasing member is a spring.

13. The method of claim 11, wherein the control signal is generated in response to a wireless signal transmitted by a mobile device.

14. The method of claim 11, wherein the power drive is an electric motor.

15. The method of claim 11, wherein the electric motor is a DC motor.

16. The method of claim 11, wherein the actuator comprises a gear configured to mesh with the power drive gear.

17. The method of claim 11, wherein the rotating the power drive gear by the activated power drive is in a first direction to manipulate the one or more lock bars from the unlocked position to the locked position.

18. The method of claim 17, wherein the rotating the power drive gear by the activated power drive is in a second direction, opposite the first direction, to manipulate the one or more lock bars from the locked position to the unlocked position.

19. A method of operating a redundant actuation lock apparatus in an electronic lock actuation mode, the redundant actuation lock apparatus having a lock bar interface configured to manipulate one or more lock bars from a locked position to an unlocked position and from the unlocked position to the locked position, the method comprising:

- engaging an actuator with a lock bar interface;
- receiving a control signal to activate a power drive;
- rotating a power drive gear by the activated power drive;
- driving the actuator by the rotating power drive gear;
- driving the lock bar interface by the actuator, wherein the actuator comprises gear teeth configured to mesh with gear teeth of the lock bar interface to perform the driving the lock bar interface by the actuator; and
- moving the one or more lock bars, by the lock bar interface, to one of the locked position and the unlocked position.

20. The method of claim 19, wherein the engaging the actuator with the lock bar interface comprises biasing, via a flexible biasing member, the actuator to engage the lock bar interface.

21. The method of claim 20, wherein the flexible biasing member is a spring.

22. The method of claim 19, wherein the control signal is generated in response to a wireless signal transmitted by a mobile device.

23. The method of claim 19, wherein the power drive is an electric motor.

24. The method of claim 19, wherein the electric motor is a DC motor.

25. The method of claim 19, wherein the actuator comprises a gear configured to mesh with the power drive gear.

26. The method of claim 19, wherein the rotating the power drive gear by the activated power drive is in a first direction to manipulate the one or more lock bars from the unlocked position to the locked position.

27. The method of claim 26, wherein the rotating the power drive gear by the activated power drive is in a second direction, opposite the first direction, to manipulate the one or more lock bars from the locked position to the unlocked position.

* * * * *